United States Patent
Aburaya et al.

(10) Patent No.: US 9,457,323 B2
(45) Date of Patent: Oct. 4, 2016

(54) CARBON DIOXIDE SEPARATION MEMBER, METHOD FOR PRODUCING SAME, AND CARBON DIOXIDE SEPARATION MODULE

(71) Applicant: FUJIFILM Corporation, Minato-ku, Tokyo (JP)

(72) Inventors: Yoshihiro Aburaya, Ashigarakami-gun (JP); Kazuki Yamazaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 14/163,484

(22) Filed: Jan. 24, 2014

(65) Prior Publication Data

US 2014/0137740 A1 May 22, 2014

Related U.S. Application Data

(63) Continuation of application No. PCT/JP2012/068120, filed on Jul. 17, 2012.

(30) Foreign Application Priority Data

Jul. 29, 2011 (JP) ................................. 2011-167196

(51) Int. Cl.
*B01D 53/22* (2006.01)
*B01D 71/60* (2006.01)
(Continued)

(52) U.S. Cl.
CPC ............... *B01D 71/60* (2013.01); *B01D 53/22* (2013.01); *B01D 53/228* (2013.01); *B01D 61/38* (2013.01);
(Continued)

(58) Field of Classification Search
CPC .... B01D 53/22; B01D 53/228; B01D 61/38; B01D 67/0088; B01D 69/02; B01D 69/142; B01D 69/148; B01D 71/60; B01D 71/02; B01D 71/022; B01D 71/36; B01D 71/46; B01D 71/52; B01D 71/58; B01D 2257/504; B01D 2323/30; B01D 2325/22; B01D 2325/34; B01D 2325/38; Y02C 10/10
See application file for complete search history.

(56) References Cited

U.S. PATENT DOCUMENTS 4,797,187 A * 1/1989 Davis ................. B01D 67/0088
204/296
5,178,766 A * 1/1993 Ikeda ................... B01D 61/022
210/490

(Continued)

FOREIGN PATENT DOCUMENTS

| EP | 2223964 A1 | 9/2010 |
| JP | 7-102310 B2 | 11/1995 |
| JP | 2009-195900 A | 9/2009 |

OTHER PUBLICATIONS

Zou J et al: "CO2-Selective Water Gas Shift Membrane Reactor for Fuel Cell Hydrogen Processing", Industrial & Engineering Chemistry Research, American Chemical Society, US, vol. 46, No. 8, Apr. 11, 2007 pp. 2272-2279.*

(Continued)

*Primary Examiner* — Anthony Shumate
(74) *Attorney, Agent, or Firm* — Sughrue Mion, PLLC

(57) ABSTRACT

A carbon dioxide separation member is disclosed, which includes: a hydrophobic porous membrane that has heat resistance to a temperature of 100° C. or higher; and a polymer compound layer that is formed on a surface of the porous membrane, the polymer compound layer including moisture, and at least one carbon dioxide carrier selected from the group consisting of alkali metal carbonates, alkali metal bicarbonates, and alkali metal hydroxides, and having a cross-linked structure that is formed with a specific single crosslinkable group and includes a specific hydrolysis-resistant bond, wherein the carbon dioxide separation member selectively allows a carbon dioxide gas in a mixture of the carbon dioxide gas and a hydrogen gas to permeate therethrough under temperature conditions of from 100° C. to 250° C.

17 Claims, 2 Drawing Sheets

(51) Int. Cl.

| | |
|---|---|
| *B01D 61/38* | (2006.01) |
| *B01D 69/02* | (2006.01) |
| *B01D 69/14* | (2006.01) |
| *B01D 67/00* | (2006.01) |
| *B01D 71/02* | (2006.01) |
| *B01D 71/36* | (2006.01) |
| *B01D 71/46* | (2006.01) |
| *B01D 71/52* | (2006.01) |
| *B01D 71/58* | (2006.01) |

(52) U.S. Cl.
CPC .......... *B01D 67/0088* (2013.01); *B01D 69/02* (2013.01); *B01D 69/142* (2013.01); *B01D 69/148* (2013.01); *B01D 71/022* (2013.01); *B01D 71/36* (2013.01); *B01D 71/46* (2013.01); *B01D 71/52* (2013.01); *B01D 71/58* (2013.01); B01D 71/02 (2013.01); B01D 2257/504 (2013.01); B01D 2323/30 (2013.01); B01D 2325/22 (2013.01); B01D 2325/34 (2013.01); B01D 2325/38 (2013.01); Y02C 10/10 (2013.01)

(56) References Cited

U.S. PATENT DOCUMENTS

| | | | | |
|---|---|---|---|---|
| 6,890,436 | B2* | 5/2005 | Komatsu | B01D 63/024 210/500.23 |
| 6,960,617 | B2* | 11/2005 | Omidian | A61K 9/0065 521/102 |
| 8,377,170 | B2* | 2/2013 | Okada | B01D 69/10 156/280 |
| 8,741,600 | B2* | 6/2014 | Yamaguchi | B01D 61/145 435/326 |
| 8,747,521 | B2* | 6/2014 | Sano | B01D 53/22 95/45 |
| 9,162,178 | B2* | 10/2015 | Hiraki | B01D 53/228 |
| 2005/0147562 | A1* | 7/2005 | Hunter | A61B 17/11 424/9.5 |
| 2008/0058440 | A1* | 3/2008 | Muller | B01D 67/0093 522/109 |
| 2008/0168900 | A1 | 7/2008 | Ho | |
| 2010/0190965 | A1* | 7/2010 | Yamaguchi | B01D 61/145 530/388.1 |
| 2011/0036237 | A1* | 2/2011 | Okada | B01D 69/10 95/51 |
| 2012/0241373 | A1* | 9/2012 | Na | B01D 69/12 210/500.38 |
| 2013/0160650 | A1* | 6/2013 | Okada | B01D 69/10 96/12 |
| 2013/0284022 | A1* | 10/2013 | Hiraki | B01D 53/228 96/4 |
| 2013/0287678 | A1* | 10/2013 | Okada | B01D 53/22 423/652 |
| 2015/0086801 | A1* | 3/2015 | Hiraki | B01J 20/02 428/500 |
| 2015/0151244 | A1* | 6/2015 | Ishizuka | B01D 53/22 422/212 |

OTHER PUBLICATIONS

Okada 2009-195900 JP Machine Translation Sep. 3, 2009 pp. 31.*
Zou et al, "$CO_2$-selective polymeric membranes containing amines in crosslinked poly(vinyl alcohol)," Journal of Membrane Science, vol. 286, No. 1-2, Dec. 15, 2006, available online Oct. 10, 2006, pp. 310-321, XP024931633.
Communication pursuant to Rule 164(1)EPC, Jan. 15, 2015, issued in corresponding EP Application No. 12820699.2, 8 pages in English.
Communication, dated May 12, 2015, issued in corresponding EP Application No. 12820699.2, 12 pages.
International Search Report for PCT/JP2012/068120 dated Sep. 11, 2012, 3 pages.
Written Opinion for PCT/JP2012/068120 dated Sep. 11, 2012, 5 pages in Japanese and English.
Zou et al., "$CO_2$-Selective Water Gas Shift Membrane Reactor for Fuel Cell Hydrogen Processing," Industrial & Engineering Chemistry Research, vol. 46, No. 8, Apr. 11, 2007, pp. 2272-2279.
First Notification of Office Action, dated Mar. 2, 2015, issued in corresponding CN Application No. 201280036419.1, 13 pages in English and Chinese.

* cited by examiner

CARBON DIOXIDE SEPARATION MEMBER, METHOD FOR PRODUCING SAME, AND CARBON DIOXIDE SEPARATION MODULE

CROSS-REFERENCE TO RELATED APPLICATIONS

This application is a continuation application of International Application No. PCT/JP2012/068120, filed Jul. 17, 2012, the disclosure of which is incorporated herein by reference in its entirety. Further, this application claims priority from Japanese Patent Application No. 2011-167196, filed Jul. 29, 2011.

TECHNICAL FIELD

The present invention relates to a carbon dioxide separation member, a method for producing the same, and a carbon dioxide separation module equipped with the carbon dioxide separation member.

BACKGROUND ART

In recent years, development of techniques for selectively separating carbon dioxide in a mixed gas is advancing. For example, as a countermeasure for global warming, a technique of collecting carbon dioxide in exhausted gas and condensing it, and a technique of reforming hydrocarbon into hydrogen and carbon monoxide (CO) by means of steam reforming, further allowing the carbon monoxide to react with steam to form carbon dioxide and hydrogen, and excluding the carbon dioxide by using a membrane which is selectively permeable to carbon dioxide, thereby obtaining gas for fuel cells or the like, which includes hydrogen as a main component, have been developed.

Meanwhile, regarding separation of carbon dioxide, an amine absorption method, in which adsorption and desorption are repeated by amines, is a general method and has been widely used. However, this method is disadvantageous in that a huge installation area is needed for the facilities and, in addition, it is necessary to repeat increasing pressure/decreasing pressure and lowering temperature/elevating temperature at the time of adsorption/desorption, which needs a large amount of energy. Further, the capacity of the system has been determined at the time of planning, and thus, it is not easy to increase or decrease the capacity of the system once formed.

In contrast, a membrane separation method is a method of performing separation naturally by utilizing the partial pressure of carbon dioxide in the two regions separated by a separation membrane and is advantageous in that consumption of energy is low and the installation area is small. Further, increase or decrease in the capacity of the system can be conducted by increasing or decreasing the number of filter units and therefore, it is possible to provide a system having excellent scalability; accordingly, the membrane separation method has recently attracted attention.

Carbon dioxide separation membranes can be roughly classified into so-called accelerated transport membranes, in which a carbon dioxide carrier is included in the membrane and carbon dioxide is transported to the opposite side of the membrane by this carrier, and so-called dissolution diffusion membranes, with which separation is performed by utilizing the difference in solubility with respect to the membrane and the difference in diffusivity in the membrane, between carbon dioxide and the substance to be subject to separation. Since a dissolution diffusion membrane is used to perform separation based on the solubilities of carbon dioxide and the substance to be subject to separation with respect to the membrane and the diffusion speeds, the degree of separation is determined unequivocally when the material and physical properties of the membrane are determined, and further, since the permeation speed increases as the thickness of the membrane gets thinner, the dissolution diffusion membrane is generally produced as a thin membrane having a thickness of 1 μm or less, by using a layer separation method, a surface polymerization method, or the like.

In contrast, in an accelerated transport membrane, by the addition of a carbon dioxide carrier into the membrane, the solubility of carbon dioxide is drastically increased, and transportation is carried out under a high concentration environment. Accordingly, the accelerated transport membrane is characterized in that, in general, the degree of separation with respect to the substance to be separated is higher and the permeation speed of carbon dioxide is higher, as compared with a dissolution diffusion membrane. Further, since the concentration of carbon dioxide in the membrane is high, the diffusion of carbon dioxide in the membrane rarely becomes a rate-limiting factor, and in the sense of increasing the degree of separation with respect to the substance to be separated, it is more preferable that the accelerated transport membrane is a thick membrane having a thickness of 1 μm or more.

For example, Japanese Patent Publication (JP-B) No. H7-102310, a technique for producing a carbon dioxide separation gel membrane has been proposed, the technique including coating an aqueous solution of an uncrosslinked vinyl alcohol-acrylic acid salt copolymer on a carbon dioxide permeable support to form a membrane, then heating and crosslinking the membrane to become water insoluble, and then allowing this water insoluble substance to absorb an aqueous solution containing a carbon dioxide carrier (a substance that has affinity with carbon dioxide), to gelate the membrane.

Further, in Japanese Patent Application Laid-Open (JP-A) No. 2009-195900, a carbon dioxide separation apparatus has been proposed, in which a gel layer obtained by adding an additive composed of cesium carbonate or cesium hydrogencarbonate or cesium hydroxide to a polyvinyl alcohol-polyacrylic acid copolymer gel membrane is provided on a hydrophilic porous membrane to form a $CO_2$ accelerated transport membrane, and a source gas including at least carbon dioxide and steam as well as a certain main component of gas is supplied to the surface of the source side of the $CO_2$ accelerated transport membrane at a supply temperature of 100° C. or higher, and then the carbon dioxide, that has been permeated through the $CO_2$ accelerated transport membrane, is taken out from the surface of the permeation side.

SUMMARY OF INVENTION

Technical Problem

Carbon dioxide separation membranes such as those shown in the above-described JP-B No. 7-102310 and JP-A No. 2009-195900 are based on the assumption that a polymer compound having plural kinds of crosslinkable groups in a side chain thereof is used, and therefore, in the formation of a cross-linked structure at the time of preparation of a gel membrane, since the crosslinking reactivities of the crosslinkable groups different from each other are different, it is difficult to control crosslinking, and further, it is remarkably difficult to control layer separation, which are practically problematic. Further, it is understood that, in the polyvinyl alcohol-polyacrylic acid copolymer described in the patent document, the hydroxyl group and carboxyl group form an ester bond by a condensation reaction, and hydrolysis proceeds during an aging test under high humidity and high temperature conditions, and thus there is concern that brittle fracture of membrane may occur.

For example, in the case of separating carbon dioxide in exhausted gas discharged from an incinerator or the like, the temperature of the exhausted gas often exceeds 100° C., so that conventional carbon dioxide separation membranes such as those that are hydrolyzed due to aging under high humidity and high temperature conditions cannot be used, and thus, for example, the temperature of the exhaust gas should be lowered to near ordinary temperature, and practically, a carbon dioxide separation member which has excellent high humidity-high temperature durability and is able to directly process high-temperature exhaust gas is earnestly desired.

Accordingly, from the viewpoints of easiness of control of cross-linked structure formation and control of physical properties of the formed cross-linked structure, above all, particularly for the purpose of improving the uniformity and durability of the gel membrane including moisture, a polymer compound layer, in which the cross-linked structure in the polymer compound layer is formed of a single cross-linkable group and the physical properties of the gel membrane are maintained at high quality, is required.

The present invention has been made in view of the above problems, and has an object of providing a carbon dioxide separation member, which exhibits excellent carbon dioxide separation characteristics and has excellent uniformity in the carbon dioxide separation membrane, as well as has a carbon dioxide separation membrane having a long life time; and a carbon dioxide separation module which is equipped with the carbon dioxide separation member and has excellent carbon dioxide separation characteristics and excellent durability. Further, another object of the invention is to provide a method for producing a carbon dioxide separation member which has excellent carbon dioxide separation characteristics, excellent uniformity in the layer, and excellent durability.

Solution to Problem

The present inventors have exerted intensive effort to address this problem and, as a result, have found that there is a correlation between the molecular weight of a polymer compound having a single crosslinkable group and the performance of separation from a hydrogen gas, and also have found that a polymer compound layer (gel membrane) having only a cross-linked structure that is formed of a polymer compound having a single crosslinkable group and has excellent hydrolysis resistance can achieve both the performance of separation from a hydrogen gas and durability, whereby the present invention has been made.

Exemplary embodiments of the present invention include the followings.

<1> A carbon dioxide separation member including a hydrophobic porous membrane that has a heat resistance of 100° C. or higher; and a polymer compound layer that is formed on a surface of the porous membrane, the polymer compound layer including moisture, and at least one carbon dioxide carrier selected from the group consisting of alkali metal carbonates, alkali metal bicarbonates, and alkali metal hydroxides, and having a cross-linked structure that is formed with a single crosslinkable group selected from the following (A) group and includes a hydrolysis-resistant bond selected from the following (B) group, wherein the carbon dioxide separation member selectively allows a carbon dioxide gas in a mixture of the carbon dioxide gas and a hydrogen gas to permeate therethrough under temperature conditions of from 100° C. to 250° C.

(A) group consists of —OH, —NH$_2$, —Cl, —CN, —COOH, and an epoxy group; and (B) group consists of an ether bond, an acetal bond, —NH—CH$_2$—CH(OH)—, —O-M-O—, —NH-M-O—, a urethane bond, —CH$_2$—CH(OH)—, and an amido bond, in which M represents Ti or Zr.

<2> The carbon dioxide separation member according to <1>, wherein a polymer compound used for the formation of the polymer compound layer has —OH as a single crosslinkable group and has a weight average molecular weight of from 130,000 to 6,000,000.

<3> The carbon dioxide separation member according to <2>, wherein the polymer compound is polyvinyl alcohol having a weight average molecular weight of from 130,000 to 6,000,000.

<4> The carbon dioxide separation member according to <1>, wherein a polymer compound used for the formation of the polymer compound layer has —NH$_2$ as a single crosslinkable group and has a weight average molecular weight of from 10,000 to 6,000,000.

<5> The carbon dioxide separation member according to any one of <1> to <4>, wherein the cross-linked structure includes an ether bond formed by allowing a crosslinking agent, that is selected from di- or higher functional epoxy compounds, to react with the single crosslinkable group possessed by the polymer compound.

<6> The carbon dioxide separation member according to any one of <1> to <5>, wherein the cross-linked structure is a cross-linked structure formed by reacting 0.01 mol to 80 mol of a crosslinking agent with 100 mol of the single crosslinkable group possessed by the polymer compound.

<7> The carbon dioxide separation member according to any one of <1> to <6>, wherein each of the alkali metal carbonates, the alkali metal bicarbonates, and the alkali metal hydroxides includes an alkaline metal atom selected from the group consisting of cesium, rubidium, potassium and sodium.

<8> The carbon dioxide separation member according to any one of <1> to <7>, wherein the polymer compound layer further includes a surfactant.

<9> The carbon dioxide separation member according to any one of <1> to <8>, wherein the polymer compound layer further includes a filler.

<10> The carbon dioxide separation member according to any one of <1> to <9>, wherein the polymer compound layer further includes a film formation suitability imparting agent.

<11> The carbon dioxide separation member according to any one of <1> to <10> including, between the polymer compound layer and the hydrophobic porous membrane, a carrier diffusion suppressing layer that suppresses diffusion of the carbon dioxide carrier.

<12> The carbon dioxide separation member according to any one of <1> to <11>, wherein the hydrophobic porous membrane includes at least one selected from the group consisting of ceramics, polytetrafluoroethylene (PTFE), polyvinylidene fluoride, polyethersulfone (PES), polyphenylene sulfide (PPS), polysulfone (PSF), polyimide (PI), polypropylene (PP), polyetherimide and polyetheretherketone.

<13> A method for producing the carbon dioxide separation member according to any one of <1> to <12>, the method including: coating, on a hydrophobic porous membrane having a heat resistance of 100° C. or higher, a casting liquid including at least one carbon dioxide carrier selected from the group consisting of alkali metal carbonates, alkali metal bicarbonates and alkali metal hydroxides; moisture; an aqueous solution of a polymer compound having a single crosslinkable group selected from the following (A) group, and a crosslinking agent; and allowing the single crosslinkable group possessed by the polymer compound to react with the crosslinking agent in the casting liquid to form a polymer compound layer having a cross-linked structure that includes a hydrolysis-resistant bond selected from the following (B) group.

(A) group consists of —OH, —NH$_2$, —Cl, —CN, —COOH, and an epoxy group; and (B) group consists of an ether bond, an acetal bond, —NH—CH$_2$—CH(OH)—, —O-M-O—, —NH-M-O—, a urethane bond, —CH$_2$—CH(OH)—, and an amido bond, in which M represents Ti or Zr.

<14> The method for producing a carbon dioxide separation member according to <13>, wherein the polymer compound layer includes polyvinyl alcohol gel having a cross-linked structure.

<15> A carbon dioxide separation module equipped with the carbon dioxide separation member according to any one of <1> to <12>.

In the present invention, the term "crosslinkable group" refers to a functional group capable of forming a cross-linked structure by bonding the crosslinkable groups directly or via an appropriate crosslinking agent. The expression "having a single crosslinkable group" means "having only one kind of crosslinkable group in the molecule", namely, it means that only one kind of crosslinkable group exists in the molecule; and the expression "formed of a single crosslinkable group" means "formed of only one kind of crosslinkable group". In the present invention, the water-soluble polymer compound used for forming the polymer compound layer (gel membrane) has a "single crosslinkable group", namely, only one kind of crosslinkable group exists in the molecule, and therefore, as described below, the cross-linked structure to be formed becomes uniform and control of the cross-linked structure-formation property can be easily conducted, which is advantageous.

The function of the present invention is not clear, but is thought as follows. Namely, in the carbon dioxide separation member of the present invention, it is thought that, since the polymer compound layer, which is a carbon dioxide separation membrane and has a form of gel containing moisture, has only a hydrolysis-resistant cross-linked structure formed of a single crosslinkable group, a carbon dioxide separation member, in which the gel membrane has high humidity-high temperature durability, as well as concerns about layer separation in the polymer compound layer and control of crosslinking are addressed, a local deterioration in carbon dioxide separation characteristics caused by ununiformity of the polymer compound layer and elution of the carbon dioxide carrier to the porous membrane are suppressed, and there is no variation in carbon dioxide separation characteristics, and which has excellent durability, is provided.

Advantageous Effects of Invention

According to the present invention, a carbon dioxide separation member, which exhibits excellent carbon dioxide separation characteristics and has excellent uniformity in the carbon dioxide separation membrane, as well as has a carbon dioxide separation membrane having a long life time; a carbon dioxide separation module; and a method for producing the carbon dioxide separation member can be provided.

DESCRIPTION OF EMBODIMENTS

Figure 1:
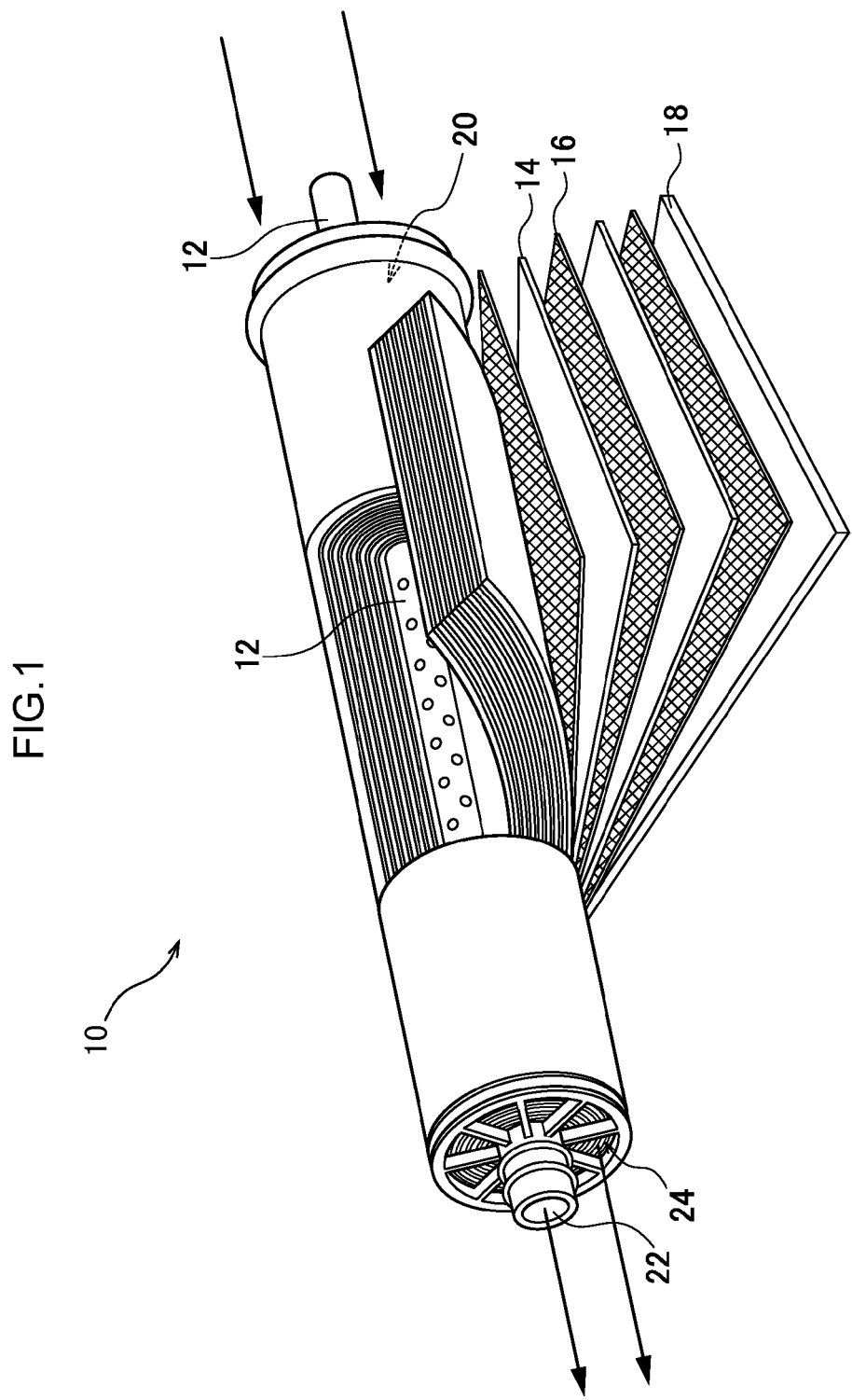
FIG. 1 is a schematic diagram showing an exemplary embodiment of a carbon dioxide separation module according to the present invention, including a cut-out section.

Hereinafter, the present invention is described in detail.

The carbon dioxide separation member of the present invention is equipped with a hydrophobic porous membrane (hereinafter, may be referred to as a "hydrophobic support") having a heat resistance of 100° C. or higher, and a polymer compound layer (hereinafter, may be referred to as a "carbon dioxide separation membrane") having carbon dioxide separation characteristics, which are described below in detail.

<Carbon Dioxide Separation Membrane>

The carbon dioxide separation membrane in the present invention is a polymer compound layer that includes moisture and at least one carbon dioxide carrier selected from the group consisting of alkali metal carbonates, alkali metal bicarbonates, and alkali metal hydroxides, and has a cross-linked structure that is formed with a single crosslinkable group selected from the following (A) group and includes a hydrolysis-resistant bond selected from the following (B) group, wherein the carbon dioxide separation membrane has a function of selectively allowing a carbon dioxide gas in a mixture of the carbon dioxide gas and a hydrogen gas to permeate therethrough under temperature conditions of from 100° C. to 250° C.

(A) group: —OH, —NH$_2$, —Cl, —CN, —COOH, an epoxy group (B) group: an ether bond, an acetal bond, —NH—CH$_2$—CH(OH)—, —O-M-O— (M represents Ti or Zr), —NH-M-O— (M represents Ti or Zr), a urethane bond, —CH$_2$—CH (OH)—, an amido bond Hereinafter, the carbon dioxide separation membrane according to the present invention is described in detail.

The polymer compound layer (carbon dioxide separation membrane) according to the present invention is a gel membrane which is obtained using a water-soluble polymer compound as a raw material and forming a cross-linked structure derived from a crosslinkable group possessed by the polymer compound, and includes a carbon dioxide carrier and moisture. In the present invention, the polymer compound layer has a hydrolysis-resistant cross-linked structure that is formed of a polymer compound having only a single crosslinkable group, namely, a polymer compound having only one kind of crosslinkable group in the molecule, and has a bond shown in (B) group above.

—Water-Soluble Polymer Compound—

The water-soluble polymer compound included in the polymer compound layer is a polymer compound, which has affinity with water and has only one kind of crosslinkable group in the molecule.

A weight average molecular weight of the water-soluble polymer compound is selected as appropriate within the range capable of forming a stable gel membrane but, for example, in the case of having —OH as the crosslinkable group, it is preferable that the weight average molecular weight is 130,000 or more. The weight average molecular weight is more preferably 166,000 or more, and even more preferably 180,000 or more. The upper limit value of the weight average molecular weight is not particularly limited but, from the viewpoint of production suitability, the upper limit value is preferably 6,000,000 or less.

In the case of having —NH$_2$ as the crosslinkable group, it is preferable that the weight average molecular weight is 10,000 or more. The weight average molecular weight is more preferably 15,000 or more, and even more preferably 20,000 or more. The upper limit value of the weight average molecular weight is not particularly limited but, from the viewpoint of production suitability, the upper limit value is preferably 6,000,000.

Regarding the weight average molecular weight of a water-soluble polymer compound, for example, in the case of using polyvinyl alcohol (PVA) as the water-soluble polymer compound, a value obtained by the measurement in accordance with JIS K 6726 is used. Further, in the case of using a commercially available product, a nominal molecular weight described in catalogs, specifications, or the like is used.

As the crosslinkable group, a group capable of forming a hydrolysis-resistant cross-linked structure is selected, and examples thereof include a hydroxyl group (—OH), an amino group (—NH$_2$), a carboxyl group (—COOH), an epoxy group, a chlorine atom (—Cl), a cyano group (—CN), and the like. Among them, an amino group and a hydroxyl group are preferable, and from the viewpoints of affinity with the carbon dioxide carrier and the carrier supporting effect, a hydroxyl group is most preferable. Examples of the epoxy group include a structure shown below. The epoxy group may have a substituent.

Preferable examples of the water-soluble polymer compound having such a single crosslinkable group include polyallylamine, polyacrylic acid, polyvinyl alcohol, polyvinyl pyrrolidone, polyacrylamide, polyethyleneimine, polyvinylamine, polyornithine, polylysine, and the like; and polyvinyl alcohol is most preferable.

The polyvinyl alcohol has, in the molecule, a hydroxyl group, which is a crosslinkable group, and an acetyl group, which is a non-crosslinkable group, and the ratio of the hydroxyl group/acetyl group is preferably 95/5 or higher, based on mole ratio, more preferably 98/2 or higher, and most preferably 99/1 or higher.

Polyvinyl alcohols are also available as commercially available products, and examples include POVAL (manufactured by Kuraray Co., Ltd.), polyvinyl alcohol (manufactured by Aldrich Corporation), and J-POVAL (manufactured by JAPAN VAM & POVAL CO., LTD.). There are various grades of molecular weight; however, it is preferable to select polyvinyl alcohol having a weight average molecular weight of from 130,000 to 300,000, as described above.

Regarding the saponification rate of polyvinyl alcohol, there are a completely saponificated type of 98% or higher, a partially saponificated type of 85% or higher, and a low saponification type of 85% or lower; however, considering the physical properties of the gel membrane to be formed, a partially saponificated type and a completely saponificated type are preferable, and a completely saponificated type is even more preferable.

As for the polyallylamine or polyethyleneimine, any polyallylamine or polyethyleneimine may be used without particular limitation, as long as the polymer has only an amino group as the crosslinkable group in the molecule. As described above, from the viewpoint of the effect, it is preferable that the molecular weight thereof is from 10,000 to 6,000,000.

Polyallylamines are available as commercially available products, examples thereof include polyallylamine manufactured by Nitto Boseki Co., Ltd., and such commercially available products may also be used preferably in the invention.

Polyethyleneimines are also available as commercially available products, and examples thereof include polyethyleneimine (EPOMIN, manufactured by NIPPON SHOKUBAI CO., LTD.).

—Crosslinking Agent—

The cross-linked structure, which is formed by the water-soluble polymer compound having a single crosslinkable group, can be formed in accordance with a conventionally known technique such as heat crosslinking, ultraviolet ray crosslinking, electron-beam crosslinking, radiation crosslinking, or photocrosslinking. Photocrosslinking or heat crosslinking is preferable, and heat crosslinking is most preferable.

In the formation of the polymer compound layer in the present invention, it is preferable to use a composition containing a crosslinking agent together with a water-soluble polymer compound. Hereinafter, the coating liquid composition for forming a polymer compound layer, which is used for the formation of the polymer compound layer, may simply be referred to as the "coating liquid composition" or "composition".

The gel membrane described in the prior art described above is formed by the use of a polyvinyl alcohol-polyacrylic acid salt copolymer, in which the polyvinyl alcohol-polyacrylic acid salt copolymer has two or more kinds of crosslinkable groups in the molecule. Accordingly, in the case of forming a cross-linked structure in this copolymer, there is a problem in, for example, that a competitive reaction between a hydroxyl group and a carboxyl group occurs, and thus the crosslinking does not proceed as planned. In the present invention, since a water-soluble polymer compound that has only one kind of crosslinkable group is used, with regard to the selection of the crosslinking agent, any crosslinking agent that has high reactivity with respect to the crosslinkable group selected from the (A) group, for example, —OH (a hydroxyl group), may be selected, so that it is advantageous in that molecular design becomes easier.

As the crosslinking agent, it is preferable to select those including a crosslinking agent that reacts with the water-soluble polymer having a single crosslinkable group and has two or more functional groups capable of performing heat crosslinking or photocrosslinking. The cross-linked structure formed is a cross-linked structure including a hydrolysis-resistant bond selected from the (B) group described above. From such a point of view, examples of the crosslinking agent, which can be used in the present invention, include an epoxy crosslinking agent, a polyvalent glycidyl ether, a polyhydric alcohol, a polyvalent isocyanate, a polyvalent aziridine, a haloepoxy compound, a polyvalent aldehyde, a polyvalent amine, an organic metal-based crosslinking agent, and the like. A polyvalent aldehyde, an organic metal-based crosslinking agent, and an epoxy crosslinking agent are preferable, an organic metal-based crosslinking agent and an epoxy crosslinking agent are more preferable, and an epoxy crosslinking agent is most preferable.

The epoxy crosslinking agent used in the present invention is a compound having two or more epoxy groups, and is preferably a compound having 4 or more epoxy groups. Epoxy crosslinking agents are available as commercially available products, and examples thereof include "EPOLITE 100MF" (manufactured by Kyoeisha Chemical Co., Ltd.; trimethylolpropane triglycidyl ether), EX-411, EX-313, EX-614B, EX-810, EX-811, EX-821, and EX-830 (all manufactured by Nagase ChemTex Corporation), EPIOL E400 (manufactured by NOF Corporation), and the like.

An oxetane compound having a cyclic ether, which is a compound similar to the epoxy crosslinking agent, is also used preferably. As the oxetane compound, a polyvalent glycidyl ether having two or more functional groups is preferable, and examples of a commercially available product include EX-411, EX-313, EX-614B, EX-810, EX-811, EX-821, and EX-830 (all manufactured by Nagase Chem-Tex Corporation), and the like.

Hereinafter, other crosslinking agents, which may be used for the formation of the cross-linked structure in the present invention, are explained.

Examples of the polyvalent glycidyl ether include ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol glycidyl ether, and polypropylene glycol diglycidyl ether.

Examples of the polyhydric alcohol include ethylene glycol, diethylene glycol, triethylene glycol, tetraethylene glycol, polyethylene glycol, glycerin, polyglycerin, propylene glycol, diethanolamine, triethanolamine, polyoxypropyl, an oxyethylene oxypropylene block copolymer, pentaerythritol, and sorbitol.

Examples of the polyvalent isocyanate include 2,4-toluylene diisocyanate and hexamethylene diisocyanate. Further, examples of the polyvalent aziridine include 2,2-bishydroxymethylbutanol-tris[3-(1-aziridinyl)propionate], 1,6-hexamethylenediethylene urea, and diphenylmethane-bis-4,4'-N,N'-diethylene urea.

Examples of the haloepoxy compound include epichlorohydrin and α-methylchlorohydrin.

Examples of the polyvalent aldehyde include glutaraldehyde and glyoxal.

Examples of the polyvalent amine include ethylenediamine, diethylenetriamine, triethylenetetramine, tetraethylenepentamine, pentaethylenehexamine, and polyethyleneimine.

Examples of the organic metal-based crosslinking agent include an organic titanium crosslinking agent and an organic zirconia crosslinking agent.

For example, in the case of using, as the polymer compound, a high-molecular weight polyvinyl alcohol having a weight average molecular weight of 130,000 or more, from the viewpoints of having good reactivity with respect to this polymer compound and being capable of forming a cross-linked structure that also has excellent hydrolysis resistance, an epoxy compound and glutaraldehyde are particularly preferable, among the above crosslinking agents.

Further, in the case of using, for example, polyallylamine having a weight average molecular weight of 10,000 or more, from the viewpoints of having good reactivity with respect to this polymer compound and being capable of forming a cross-linked structure that also has excellent hydrolysis resistance, an epoxy compound, glutaraldehyde, and an organic metal crosslinking agent are particularly preferable.

In the case of using, as the polymer compound, polyethyleneimine or polyallylamine, an epoxy compound is particularly preferable as the crosslinking agent.

In a case in which the coating liquid composition for forming a polymer compound layer includes a crosslinking agent, the content of the crosslinking agent is preferably from 0.001 parts by mass to 80 parts by mass, more preferably from 0.01 parts by mass to 60 parts by mass, and most preferably from 0.1 parts by mass to 50 parts by mass, with respect to 100 parts by mass of the amount of the crosslinkable group possessed by the polymer compound. When the content is within the above range, favorable cross-linked structure-formation property can be obtained and favorable shape retaining property of the formed gel membrane can be obtained.

Further, when giving attention to the crosslinkable group possessed by the polymer compound, it is preferable that the cross-linked structure is a cross-linked structure formed by reacting 0.01 mol to 80 mol of the crosslinking agent with 100 mol of the crosslinkable group possessed by the polymer compound.

—Carbon Dioxide Carrier—

The carbon dioxide carrier is a water-soluble inorganic substance that has affinity with carbon dioxide and exhibits basic properties. In the present invention, the carbon dioxide carrier is selected from the group consisting of alkali metal carbonates, alkali metal bicarbonates, and alkali metal hydroxides. Here, as the alkaline metal, an alkaline metal atom selected from the group consisting of cesium, rubidium, potassium, and sodium is preferably used.

Examples of the alkali metal carbonates include lithium carbonate, sodium carbonate, potassium carbonate, rubidium carbonate, and cesium carbonate.

Examples of the alkali metal bicarbonates include lithium hydrogencarbonate, sodium hydrogencarbonate, potassium hydrogencarbonate, rubidium hydrogencarbonate, and cesium hydrogencarbonate.

Examples of the alkali metal hydroxides include lithium hydroxide, sodium hydroxide, potassium hydroxide, rubidium hydroxide, and cesium hydroxide.

Among these, from the viewpoint of having favorable affinity with carbon dioxide, compounds containing potassium, rubidium, or cesium, as the alkaline metal atom, are preferred.

The content of the carbon dioxide carrier in the polymer compound layer is preferably from 0.1 parts by mass to 5 parts by mass, more preferably from 0.2 parts by mass to 4 parts by mass, and particularly preferably from 0.3 parts by mass to 3 parts by mass, with respect to 1 part by mass of the water-soluble polymer compound. When the content is within the above range, sufficient carbon dioxide carrier performance can be obtained and salting out of the carbon dioxide carrier, which may occur when the carrier is contained too much, is suppressed.

—Other Components—

The composition used for the formation of the polymer compound layer may include any of various additives, in addition to the water-soluble polymer compound, the crosslinking agent, the carbon dioxide carrier, and water as the solvent.

Reaction Accelerating Additive

It is preferable to use, as the additive, a nitrogen-containing compound or a sulfur oxide, which is a reaction accelerating additive, for the purpose of accelerating the reaction between carbon dioxide and the carbon dioxide carrier.

Examples of the nitrogen-containing compound, which may be used, include amino acids such as glycine, alanine, serine, proline, histidine, taurine, diaminopropionic acid; hetero compounds such as pyridine, histidine, piperazine, imidazole, or triazine; alkanolamines such as monoethanolamine, diethanolamine, triethanolamine, monopropanolamine, dipropanolamine, or tripropanolamine; cyclic polyetheramines such as cryptand [2.1] or cryptand [2.2]; bicyclic polyetheramines such as cryptand [2.2.1] or cryptand [2.2.2]; porphyrin; phthalocyanine; ethylenediamine tetraacetate, and the like.

Examples of the sulfur compound, which may be used, include amino acids such as cystine or cysteine; polythiophene; dodecylthiol, and the like.

Antioxidant

The coating liquid composition may include an antioxidant, as long as the effects of the present invention are not impaired. When an antioxidant is added, the high humidity-high temperature durability may be improved further, which is advantageous.

Commercially available products may be used as the antioxidant, and preferable examples of the antioxidant include dibutylhydroxytoluene (BHT), IRGANOX 1010, IRGANOX 1035FF, IRGANOX 565, and the like.

Filler

The coating liquid composition may contain a filler.

The filler may be either an organic filler or an inorganic filler, as long as the filler has affinity with the above-described water-soluble polymer compound or carbon dioxide carrier, and does not damage the shape retaining property of the gel membrane under a high-pressure environment.

Examples of the organic filler include starch, pulp, cellulose, a melanin-based resin, a polymethyl methacrylate-based resin, a polystyrene-based resin, a polypropylene-based resin, a high-styrene resin, a chroman-indene resin, a phenol formaldehyde resin, a modified melanin resin, lignin, rubber powder, EBO powder, and an epoxy-based resin. Examples of the organic filler further include a biodegradable resin such as polylactic acid.

Examples of the inorganic filler include talc, silicon dioxide, diatomaceous earth, kaolin, mica, asbestos, gypsum, graphite, glass balloons, glass beads, glass fiber, calcium sulfate, barium sulfate, ammonium sulfate, calcium sulfite, calcium carbonate, whisker-shaped calcium carbonate, magnesium carbonate, dawsonite, dolomite, potassium titanate, carbon black, glass fiber, alumina fiber, boron fiber, processed mineral fiber, carbon fiber, hollow carbon sphere, bentonite, montmorillonite, copper powder, sodium sulfate, potassium sulfate, zinc sulfate, copper sulfate, iron sulfate, magnesium sulfate, aluminium sulfate, aluminium potassium sulfate, ammonium nitrate, sodium nitrate, potassium nitrate, aluminium nitrate, ammonium chloride, sodium chloride, potassium chloride, magnesium chloride, calcium chloride, sodium phosphate, potassium chromate, calcium citrate, lanthanum hexaboride, antimony doped tin oxide, silica, ground calcium carbonate, light calcium carbonate, surface treated calcium carbonate, aluminium hydroxide, aluminium oxide, titanium oxide, diatomaceous earth, barium sulfate, calcium sulfate, zeolite, zinc oxide, silicic acid, silicate, mica, magnesium carbonate, clay such as halloysite, pyrophyllite, or sericite, talc clay, kaolin, aluminium hydroxide, calcium carbonate, titanium dioxide, barium sulfate, satin white, talc, silicate, oxide ceramics such as alumina, titania, zirconia, magnesia, ceria, yttria, zinc oxide, or iron oxide, nitride ceramics such as silicon nitride, titanium nitride, or boron nitride, seramics such as silicon carbide, calcium carbonate, aluminium sulfate, aluminium hydroxide, potassium titanate, talc, kaolin clay, kaolinite, halloysite, pyrophyllite, montmorillonite, sericite, amesite, bentonite, asbestos, calcium silicate, magnesium silicate, diatomaceous earth, or silica sand, water-swelling phyllosilicate, talc, calcium carbonate, smectite such as gypsum (montmorillonite, beidellite, nontronite, saponite, hectorite, sauconite, or stevensite) or vermiculite, scoria, pumice, and the like.

In the coating liquid composition, one kind of filler may be used singly, or two or more kinds of fillers may be used in combination. In the case of using two or more kinds of fillers in combination, two or more kinds of organic fillers may be used in combination, or two or more kinds of inorganic fillers may be used in combination, or fillers may be used in a form of a mixture of organic and inorganic fillers.

The particle diameter of the filler is not particularly limited, but the particle diameter is desirably in a range of from 0.1 µm to 5 µm, preferably in a range of from 0.1 µm to 2 µm, and more preferably in a range of from 0.3 µm to 2 µm, from the viewpoint of being less likely to form a defect. Note that, a particle diameter of a filler is measured by a light scattering method.

In the case of using a filler in the composition, the content of the filler is preferably in a range of from 0.001% by mass to 70% by mass with respect to the water-soluble polymer compound.

When adding a filler, a dispersion prepared by dispersing the filler in an aqueous solution may be mixed with the water-soluble polymer compound and used, or the filler may be directly dispersed in the water-soluble polymer compound and used.

Preferably, a filler selected from the group consisting of metal-based fillers such as a titanium-based filler or a zirconia-based filler, inorganic fillers such as barium sulfate, carbon black, and the like may be mixed with the water-soluble polymer compound. More preferable examples of the filler include barium sulfate and a carbon-based filler. Further, more preferably, a carbon-based filler may be dispersed in the water-soluble polymer compound.

Surfactant

The coating liquid composition may include a surfactant.

By the inclusion of a surfactant, at the time of forming the polymer compound layer, the surfactant is unevenly distributed so as to be located at the interface between the polymer compound layer and the porous membrane, which is a support, and the hydrophobic moiety of the surfactant adheres to the surface of the porous membrane to form a thin layer at the interface between the polymer compound layer and the porous membrane, and thus, permeation of the carbon dioxide carrier is prevented. Thereby, the performance of the carbon dioxide separation membrane is stabilized. Further, in the coating step of the coating liquid composition, since bleeding of the carbon dioxide carrier can be suppressed and it is possible to improve wettability with respect to the hydrophobic porous membrane, film thickness ununiformity can be suppressed, and the stability of the performance can be further imparted.

The surfactant used in the present invention may be a surfactant whose hydrophobic moiety forms an in-plane thin layer so as not to impair the effect of preventing permeation of the carbon dioxide carrier. Examples of the surfactant include a compound having an alkyl chain having from 2 to 50 carbon atoms (preferably, a compound having a long alkyl chain (having from 12 to 50 carbon atoms)), a compound containing a polyoxypropylene chain, a compound having a fluorine-containing substituent, the physical property of which may be any of an anionic type, cationic type, nonionic type, or amphoteric type. One of these compounds may be used singly, or two or more of them may be used in combination.

Examples of such a surfactant include polyoxyethylene-polyoxypropylene glycols, polyoxyethylene alkyl phenyl ethers, polyoxyethylene alkyl ethers, and fluorocarbon surfactants.

Among them, fluorocarbon surfactants are particularly preferable from the viewpoint of suppressing penetration of the carbon dioxide carrier into the support, and examples of a commercially available product of the fluorocarbon surfactant, which may be used in the present invention, include ZONYL FSN100 (nonionic fluorocarbon surfactant; manufactured by Sigma-Aldrich Corporation), SURFLON S-242 (nonionic fluorocarbon surfactant; manufactured by AGC Seimi Chemical Co., Ltd.) and the like.

In a case in which the coating liquid composition contains a surfactant, the content of the surfactant is preferably from 0.01% by mass to 10% by mass in terms of a solid content, more preferably from 0.02% by mass to 9% by mass, and even more preferably from 0.03% by mass to 8% by mass, with respect to the whole polymer compound layer formed. When the content of the surfactant is within the above range, penetration of the carbon dioxide carrier into the support is sufficiently suppressed, and lowering in production suitability, such as foaming of a coating liquid, which may occur by the addition of a surfactant, or the like, does not occur.

—Hydrophobic Porous Membrane (Support) Having Heat Resistance of 100° C. Or Higher—

The support is a substance that supports the carbon dioxide separation membrane, and is not particularly limited as long as the support has carbon dioxide permeability, a carbon dioxide separation membrane (polymer compound layer), which is a gel membrane, can be formed thereon by coating the above-described composition, and the support can support the membrane and is capable of maintaining the shape of the porous membrane within the temperature range of from 100° C. to 250° C. Namely, the "heat resistance of 100° C. or higher" means that, even after the porous membrane is stored under temperature conditions of equal to or higher than 100° C. for two hours, the form of the porous membrane before storage is maintained, and curling, which is caused due to thermal shrinkage or thermofusion and is capable of being visually observed, does not occur.

Further, in this specification, the term "hydrophobic" indicates that the water contact angle at 25° C. is greater than or equal to 90°.

Examples of a material of the porous membrane include paper, high quality paper, coated paper, cast coated paper, synthetic paper, cellulose; resin materials such as polyester, polyolefin, polyamide, polyimide, polysulfone, aramid, or polycarbonate; and inorganic materials such as metals, glass, or ceramics. Preferable examples of the resin materials include polyethylene, polystyrene, polyethylene terephthalate, polytetrafluoroethylene (PTFE), polyethersulfone (PES), polyphenylene sulfide (PPS), polysulfone (PSF), polypropylene (PP), polyimide, polyetherimide, polyetheretherketone, and polyvinylidene fluoride.

From the viewpoint of heat resistance, preferable examples of the material include inorganic materials such as ceramics, glass, or metals, and organic resin materials having a heat resistance of 100° C. or higher; and any of a high molecular weight polyester, polyolefin, a heat resistant polyamide, polyimide, polysulfone, aramid, polycarbonate, a metal, glass, ceramics, or the like may be used preferably. More specifically, it is preferable that the porous membrane includes at least one material selected from the group consisting of ceramics, polytetrafluoroethylene, polyvinylidene fluoride, polyethersulfone, polyphenylene sulfide, polysulfone, polyimide, polypropylene, polyetherimide, and polyetheretherketone.

More specific examples include a membrane of a membrane filter which is formed from a material such as polyphenyl sulfide, polysulfone, cellulose, or the like; an expanded porous membrane formed from a material such as polytetrafluoroethylene, polyvinylidene fluoride, a high molecular weight polyester, or the like; and a porous membrane formed from an accumulated body of heat resistant polyimide nanofiber. From the viewpoints of heat resistance and porosity, and from the viewpoints that the degree of inhibition against diffusion of carbon dioxide is small and that the strength, production suitability, and the like are good, an expanded membrane of polytetrafluoroethylene is particularly preferable.

These porous membranes may be used singly as a support, but a composite membrane which is integrated with a reinforcing support can also be used preferably, as long as the composite membrane has a hydrophobic porous membrane at the surface, namely, the face that contacts the polymer compound layer.

When the support is too thick, gas permeability lowers, and when the support is too thin, the strength is not sufficient. Therefore, the thickness of the support is preferably from 30 μm to 500 μm, more preferably from 50 μm to 300 μm, and particularly preferably from 50 μm to 200 μm.

<Method for Producing Polymer Compound Layer (Carbon Dioxide Separation Membrane)>

The method for producing a polymer compound layer (carbon dioxide separation membrane) in the carbon dioxide separation member according to the present invention includes a step of coating, on the porous membrane, a composition for forming a polymer compound layer, the composition including a water-soluble polymer compound having a single crosslinkable group, a carbon dioxide carrier, water, and preferably a surfactant.

Hereinafter, the carbon dioxide separation membrane according to the present invention and a method for producing the same are described in detail.

—Preparation of Polymer Compound Layer (Gel Membrane)—

The water-soluble polymer compound contained in the above-described composition for forming a polymer compound layer functions as a binder that supports the carbon dioxide carrier, and is in the form of a gel membrane that stably retains moisture, so that the carbon dioxide carrier can demonstrate the function of separation of carbon dioxide. The water-soluble polymer compound is preferably a compound that is soluble to water and can form a coating liquid, as well as has a high carbon dioxide carrier retaining performance.

The respective components contained in the composition are mixed and stirred, for example, while heating at 70° C. to 95° C. for about 10 minutes to about 10,000 minutes, to prepare a coating liquid composition, and then this coating liquid composition is coated on the hydrophobic porous membrane to provide a coating film.

The temperature of the composition in the coating step may be determined according to the composition or the concentration, such that gelation or salting-out does not occur; however, when the temperature is too high, there is concern that a large amount of solvent may evaporate from the composition to change the composition concentration or gelation may proceed partially, or evaporation trace may remain at the coating film, and therefore, the temperature is preferably in a range of equal to or higher than room temperature (25° C.) but lower by at least 5° C. than the boiling point of the solvent to be used, more preferably in a range of equal to or higher than room temperature but lower by at least 15° C. than the boiling point of the solvent to be used, and most preferably in a range of equal to or higher than room temperature but lower by at least 20° C. than the boiling point of the solvent to be used. More specifically, in the case of using water (boiling point: 100° C.) as the solvent, the temperature is preferably in a range of from about 25° C. to about 95° C.

Regarding the method of coating the composition, a conventionally known method can be employed. Examples include a curtain flow coater, an extrusion die coater, an air doctor coater, a blade coater, a rod coater, a knife coater, a squeeze coater, a reverse roll coater, a bar coater, and the like. Particularly, from the viewpoints of the film thickness uniformity, the coating amount, and the like, an extrusion die coater is preferable.

After the formation of the coated layer, heating or light irradiation is performed according to the kind of the cross-linking agent, to form a cross-linked structure in the polymer compound layer, thereby forming a polymer compound layer according to the present invention, which is a stable gel membrane.

The film thickness of the polymer compound layer may be selected as appropriate depending on the separation performance needed, but generally, the film thickness is preferably from 0.1 µm to 600 µm, more preferably from 0.5 µm to 500 µm, and particularly preferably from 1 µm to 400 µm.

In the carbon dioxide separation member of the present invention, the polymer compound layer is formed on the surface of the hydrophobic porous membrane having a heat resistance of 100° C. or higher. The polymer compound layer may exist on the surface of the porous membrane as a layer having a uniform thickness. Alternatively, at the time of coating the coating liquid composition or during the heating or light irradiation step for forming a cross-linked structure, a part of the coating liquid may be gelated in the state of having entered the interior of the holes of the porous membrane, and thus the polymer compound layer may exist not only on the surface but also in the holes of the porous membrane.

Carrier Diffusion Suppressing Layer

The carbon dioxide separation member of the present invention may have a carrier diffusion suppressing layer for suppressing diffusion of the carbon dioxide carrier, between the porous membrane, which is a support, and the polymer compound layer.

It is required to suppress permeation of carrier ions of the carbon dioxide carrier under a high humidity and high temperature environment. Namely, when carrier ions permeate or diffuse, and are not retained in the polymer compound layer and disappear, the carbon dioxide separation characteristics may be deteriorated with time, and therefore, it is important to suppress this phenomenon, in order to enhance the durability of the carbon dioxide separation member.

For suppressing the carrier diffusion, various materials can be considered; however, regarding the suppression of permeation of carrier ions, the following two methods can be considered.

1. A method of using a reverse osmosis membrane for suppressing diffusion of carrier ions.
2. A method of retaining carrier ions through Coulomb force.

In the 1. method of using a reverse osmosis membrane, a reverse osmosis membrane is superposed on a porous support by rolling or the like, and on this assembly, a gel membrane is prepared.

The method of using a reverse osmosis membrane is useful; however, there are problems in that the cost is extremely high and a complicated step such as lamination of membranes is needed.

On the contrary, regarding the 2. method of retaining carrier ions through Coulomb force, a polymer compound layer having a function of retaining carrier ions can be formed on a porous support, simply and easily, for example, by a coating method.

Examples of a material that has a function of retaining carrier ions through Coulomb force include siloxane, silicone rubber, polybutadiene, ethyl cellulose, polyvinylidene fluoride, polypropylene, polysulfone, polyetherimide, polyethersulfone, polyacrylic acid, and polyvinyl alcohol; and one kind of these materials may be used singly or two or more of them may be used in combination.

The carrier diffusion suppressing layer is formed by preparing a coating liquid containing the material capable of retaining carrier ions, coating the coating liquid on the porous membrane (support), and drying. The film thickness (coating amount) of the carrier diffusion suppressing layer is selected as appropriate depending on the purpose, but is preferably, for example, in a range of from 0.01 µm to 100 µm.

Further, in a case in which such a carrier diffusion suppressing layer is formed using a hydrogen ion ($H^+$) donating material, for example, acrylic acid or sulfonic acid, since a reaction (Reaction 1) as shown below is accelerated, an elimination reaction of carbon dioxide gas may be accelerated, and the initial performance of $CO_2$ permeation flow rate may be enhanced, and thus, it is expected that the carbon dioxide separation performance may also be enhanced.

$$HCO_3^- + H^+ \rightarrow H_2O + CO_2 \qquad \text{(Reaction 1)}$$

In the case of forming the polymer compound layer on the carrier diffusion suppressing layer, the polymer compound layer may be formed on a porous membrane having thereon a carrier diffusion suppressing layer that has been formed in advance as described above, by the same method as the method described above.

Film Formation Suitability Imparting Agent

To the composition according to the present invention, a setting agent, a viscosity adjusting agent, a thixotropic property adjusting agent, or the like may be added, in order to impart film forming stability during coating.

As the setting agent, polysaccharides are preferable. From the viewpoints of film-formation property, availability, cost, membrane strength, and the like, agar is most preferable, and examples of a commercially available product include NA AGAR UP-37, UM-11S, SY-8, ZY-4, and ZY-6 (all manufactured by Ina Food Industry Co., Ltd.), AGAROSE H and AGAROSE S (all manufactured by NIPPON GENE CO., LTD.), and the like.

As the viscosity adjusting agent, a water-soluble thickener is preferable, and an artificially synthesized substance is most preferable. Examples of a water-soluble artificially synthesized thickener include vinyl-based compounds, vinylidene compounds, polyvinyl alcohol-based compounds, polyether-based compounds, and the like.

As the thixotropic property adjusting agent, a water-soluble substance is preferable, and a water-soluble naturally synthesized thickener is more preferable. Examples include synthetic mica and a carboxyvinyl polymer.

These film formation suitability imparting agents may be used singly, or two or more of them may be used as a mixture. Among these film formation suitability imparting agents, substances which exhibit further improved gelling ability by mixing are known, and these substances can be mixed and used in order to adjust the gelation speed, the gelation ability, or the gelation temperature.

<Carbon Dioxide Separation Module>

In a carbon dioxide separation module, the carbon dioxide separation member of the present invention, in which the porous membrane and the carbon dioxide separation membrane are disposed one on another in layers, may be provided as a flat membrane, or the carbon dioxide separation member of the present invention may be utilized by processing into a spiral wound type known as a reverse osmosis membrane module, a pleated type having a shape as described in, for example, JP-A No. 2010-279885, or the like.

Hereinafter, a carbon dioxide separation module in which the carbon dioxide separation member of the present invention as a spiral wound type is incorporated is described as an example.

Figure 2:
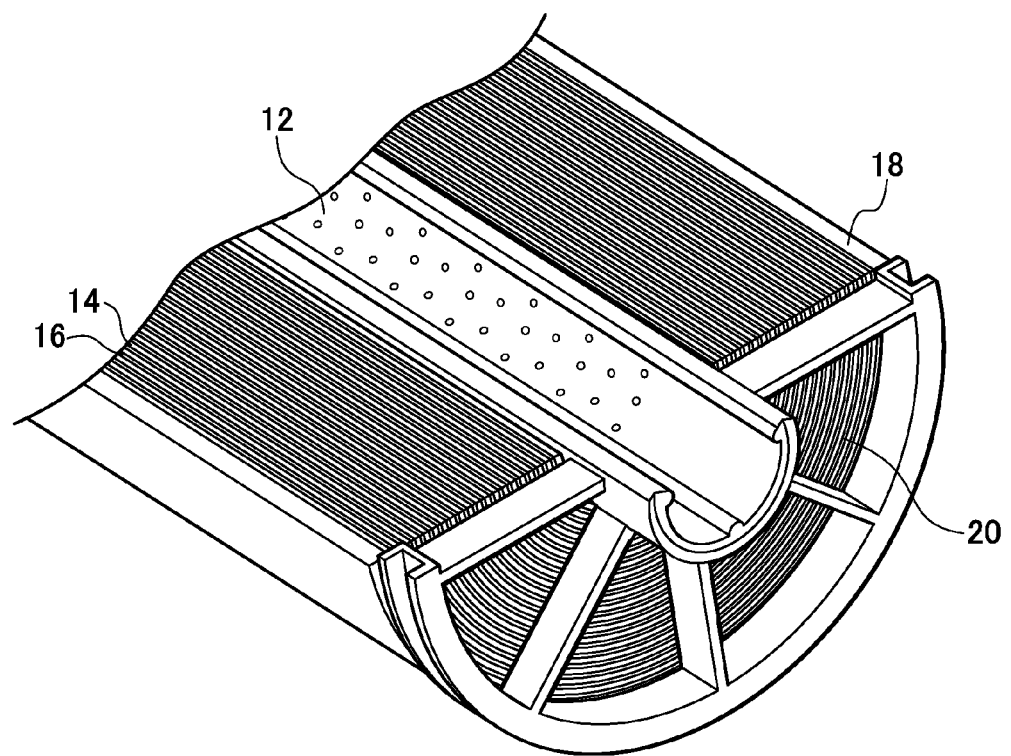
FIG. 2 is a perspective diagram showing a cross-section of the carbon dioxide separation module shown in FIG. 1.

FIG. 1 is a schematic diagram showing an exemplary embodiment of a carbon dioxide separation module 10 according to the present invention, including a cut-out section, and FIG. 2 is a perspective diagram showing the cross-section thereof.

The spiral wound type carbon dioxide separation module 10 is configured by winding a single or plural laminated bodies formed from a carbon dioxide separation member 14 and a flow passage member 16 that is provided adjacent thereto, around a hollow central pipe 12 having holes, as a fundamental structure. The circumference of the region, which separates carbon dioxide and is formed from the carbon dioxide separation member 14 and the flow passage member 16, is covered with a cover layer 18 formed from a material capable of shielding fluid, such as gas, that passes through the interior of the module.

Here, the carbon dioxide separation member 14 is the carbon dioxide separation member 14 of the present invention, which is a laminated body of the polymer compound layer and the porous membrane.

It is preferable that the flow passage member 16 used in the carbon dioxide separation module 10 has a function of accelerating the turbulent flow of the supplied fluid (renewal of the surface of the membrane face) to increase the membrane permeation speed of the carbon dioxide in the supplied fluid, and a function of reducing the pressure drop at the supply side as far as possible.

Since the flow passage member 16 preferably has a function as a spacer and causes turbulent flow in the fluid, a net-shaped flow passage member 16 is preferably used. The passage of the fluid changes due to the shape of the net, and therefore, the shape of the unit lattice of the net is selected from, for example, a diamond shape, parallelogram, or the like and used, depending on the purpose. The material of the flow passage member 16 is by no means limited; however, since the carbon dioxide separation membrane 14 according to the present invention may be used under temperature conditions of 100° C. or higher, a heat resistant material is preferable, and the material described above as the material of the porous membrane is also preferably used as the material of the flow passage member 16.

As described above, in the exemplary embodiment of the present invention, the carbon dioxide separation module 10 is equipped with a region, which separates carbon dioxide and is formed by winding, around a hollow central pipe 12 having holes for collecting the separated carbon dioxide, a laminated body of a polymer compound layer and a porous membrane (carbon dioxide separation member) 14, and a net-shaped flow passage member 16, wherein the circumference of the region is covered with a cover layer 18 having fluid-non-permeation property.

The gas containing carbon dioxide is supplied from the carbon dioxide separation member edge portion 20. When the gas containing carbon dioxide passes through the region which is divided by the cover layer 18, equipped with the carbon dioxide separation member 14, and separates carbon dioxide, the carbon dioxide that has passed through the polymer compound layer 14 and has been separated, is accumulated at the hollow central pipe 12 and is collected from an opening 22 connected to the hollow central pipe 12. Further, the remaining gas separated from carbon dioxide, which has passed through the voids of the porous membrane or the voids of the flow passage member 16, in the carbon dioxide separation member 14, is discharged from an edge portion 24 of the carbon dioxide separation member, the edge portion being on the side at which the opening 22 for collecting carbon dioxide is provided, in the carbon dioxide separation module 10.

To the hollow central pipe 12 for collecting carbon dioxide, a carrier gas selected from inert gases or the like may be supplied.

EXAMPLES

Hereinafter, examples of the present invention are explained; however, the present invention is by no means limited to these examples.

Example 1

<Preparation of Carbon Dioxide Separation Member (1)>

50 g of a 5% by mass aqueous solution of PVA (manufactured by Aldrich Corporation) having a molecular weight of 180,000 and a saponification rate of 99%, 0.7 g of epoxy crosslinking agent (EX-810, manufactured by NOF Corporation), 33.86 g of pure water, and 0.5 g of agar were mixed, and the mixture was stirred at 95° C. for 60 minutes.

Thereafter, 15 g of a 40% by mass aqueous solution of cesium carbonate were added to the mixture dropwise, to prepare a coating liquid composition for forming a polymer compound layer.

As a support, s-PTFE (manufactured by Nakao Filter Media Corp.; 200 μm thick) which is a porous membrane having hydrophobicity was used, and on this support, the coating composition thus obtained was coated and then dried, to prepare carbon dioxide separation member (1) equipped with a polymer compound having a cross-linked structure on the porous membrane.

Note that, PVA has —OH as a single crosslinkable group, and the cross-linked structure formed by the above reaction is a structure having an ether bond, in the (B) group. The cross-linked structure formed by the above reaction can be confirmed by measuring infrared spectroscopy or NMR of the gel membrane in the carbon dioxide separation member (1).

Example 2

<Preparation of Carbon Dioxide Separation Member (2)>
Preparation of carbon dioxide separation member (2) was conducted in a manner similar to that in Example 1, except that 0.7 g of organic titanium crosslinking agent (TC-315, manufactured by Matsumoto Fine Chemical Co., Ltd.) were used, instead of using 0.7 g of epoxy crosslinking agent (EX-810, manufactured by NOF Corporation).

The cross-linked structure formed by the above reaction is a structure having a —O—Ti—O— bond, in the (B) group.

Example 3

<Preparation of Carbon Dioxide Separation Member (3)>
Preparation of carbon dioxide separation member (3) was conducted in a manner similar to that in Example 1, except that 0.7 g of organic zirconia crosslinking agent (TC-315, manufactured by Matsumoto Fine Chemical Co., Ltd.) were used, instead of using 0.7 g of epoxy crosslinking agent (EX-810, manufactured by NOF Corporation).

The cross-linked structure formed by the above reaction is a structure having a —O—Zr—O— bond, in the (B) group.

Example 4

<Preparation of Carbon Dioxide Separation Member (4)>
Preparation of carbon dioxide separation member (4) was conducted in a manner similar to that in Example 1, except that 0.7 g of glutaraldehyde (manufactured by Wako Pure Chemical Industries, Ltd.) were used, instead of using 0.7 g of epoxy crosslinking agent (EX-810, manufactured by NOF Corporation).

The cross-linked structure formed by the above reaction is a structure having an acetal bond, in the (B) group.

Example 5

<Preparation of Carbon Dioxide Separation Member (5)>
Preparation of carbon dioxide separation member (4) was conducted in a manner similar to that in Example 1, except that 50 g of a 5% by mass aqueous solution of PVA (manufactured by Aldrich Corporation) having a molecular weight of 166,000 and a saponification rate of 99% were used, instead of using 50 g of a 5% by mass aqueous solution of PVA (manufactured by Aldrich Corporation) having a molecular weight of 180,000 and a saponification rate of 99%.

The cross-linked structure formed by the above reaction is a structure having an ether bond, in the (B) group.

Example 6

<Preparation of Carbon Dioxide Separation Member (6)>
Preparation of carbon dioxide separation member (6) was conducted in a manner similar to that in Example 1, except that 50 g of a 5% by mass aqueous solution of PVA (manufactured by Aldrich Corporation) having a molecular weight of 130,000 and a saponification rate of 99% were used, instead of using 50 g of a 5% by mass aqueous solution of PVA (manufactured by Aldrich Corporation) having a molecular weight of 180,000 and a saponification rate of 99%.

The cross-linked structure formed by the above reaction is a structure having an ether bond, in the (B) group.

Example 7

<Preparation of Carbon Dioxide Separation Member (7)>
Preparation of carbon dioxide separation member (7) was conducted in a manner similar to that in Example 1, except that 50 g of a 5% by mass aqueous solution of PVA (manufactured by JAPAN VAM & POVAL CO., LTD.) having a molecular weight of 110,000 and a saponification rate of 99% were used, instead of using 50 g of a 5% by mass aqueous solution of PVA (manufactured by Aldrich Corporation) having a molecular weight of 180,000 and a saponification rate of 99%.

The cross-linked structure formed by the above reaction is a structure having an ether bond, in the (B) group.

Example 8

<Preparation of Carbon Dioxide Separation Member (8)>
Preparation of carbon dioxide separation member (8) was conducted in a manner similar to that in Example 7, except that 0.7 g of glutaraldehyde (manufactured by Wako Pure Chemical Industries, Ltd.) were used, instead of using 0.7 g of epoxy crosslinking agent (EX-810, manufactured by NOF Corporation).

The cross-linked structure formed by the above reaction is a structure having an acetal bond, in the (B) group.

Example 9

<Preparation of Carbon Dioxide Separation Member (9)>
Preparation of carbon dioxide separation member (9) was conducted in a manner similar to that in Example 7, except that 0.7 g of organic titanium crosslinking agent (TC-315, manufactured by Matsumoto Fine Chemical Co., Ltd.) were used, instead of using 0.7 g of epoxy crosslinking agent (EX-810, manufactured by NOF Corporation).

The cross-linked structure formed by the above reaction is a structure having a —O—Ti—O— bond, in the (B) group.

Example 10

<Preparation of Carbon Dioxide Separation Member (10)>
Preparation of carbon dioxide separation member (10) was conducted in a manner similar to that in Example 1, except that 50 g of a 5% by mass aqueous solution of polyallylamine (manufactured by Sigma-Aldrich Corporation) having a molecular weight of 30,000 were used, instead of using 50 g of a 5% by mass aqueous solution of PVA (manufactured by Aldrich Corporation) having a molecular weight of 180,000 and a saponification rate of 99%.

Note that, polyallylamine has —NH$_2$ as a single crosslinkable group, and the cross-linked structure formed by the above reaction is a structure having a —NH—CH$_2$—CH(OH)— bond, in the (B) group.

Example 11

<Preparation of Carbon Dioxide Separation Member (11)>
Preparation of carbon dioxide separation member (11) was conducted in a manner similar to that in Example 10, except that 0.7 g of organic titanium crosslinking agent (TC-315, manufactured by Matsumoto Fine Chemical Co., Ltd.) were used, instead of using 0.7 g of epoxy crosslinking agent (EX-810, manufactured by NOF Corporation).

The cross-linked structure formed by the above reaction is a structure having a —O—Ti—O— bond, in the (B) group.

Example 12

<Preparation of Carbon Dioxide Separation Member (12)>

Preparation of carbon dioxide separation member (12) was conducted in a manner similar to that in Example 1, except that 50 g of a 5% by mass aqueous solution of polyethyleneimine (manufactured by Sigma-Aldrich Corporation) having a molecular weight of 30,000 were used, instead of using 50 g of a 5% by mass aqueous solution of PVA (manufactured by Aldrich Corporation) having a molecular weight of 180,000 and a saponification rate of 99%.

Note that, polyethyleneimine has an amino group as a single crosslinkable group, and the cross-linked structure formed by the above reaction is a structure having a —NH—CH$_2$—CH(OH)— bond, in the (B) group.

Example 13

<Preparation of Carbon Dioxide Separation Member (13)>

Preparation of carbon dioxide separation member (13) was conducted in a manner similar to that in Example 12, except that 0.7 g of organic titanium crosslinking agent (TC-315, manufactured by Matsumoto Fine Chemical Co., Ltd.) were used, instead of using 0.7 g of epoxy crosslinking agent (EX-810, manufactured by NOF Corporation).

The cross-linked structure formed by the above reaction is a structure having a —NH—Ti—O— bond, in the (B) group.

Example 14

<Preparation of Carbon Dioxide Separation Member (14)>

Preparation of carbon dioxide separation member (14) was conducted in a manner similar to that in Example 1, except that 50 g of a 5% by mass aqueous solution of polyallylamine (manufactured by Sigma-Aldrich Corporation) having a molecular weight of 20,000 were used, instead of using 50 g of a 5% by mass aqueous solution of PVA (manufactured by Aldrich Corporation) having a molecular weight of 180,000 and a saponification rate of 99%.

Note that, polyallylamine has —NH$_2$ as a single crosslinkable group, and the cross-linked structure formed by the above reaction is a structure having a —NH—CH$_2$—CH(OH)— bond, in the (B) group.

Example 15

<Preparation of Carbon Dioxide Separation Member (15)>

Preparation of carbon dioxide separation member (15) was conducted in a manner similar to that in Example 14, except that 0.7 g of organic titanium crosslinking agent (TC-315, manufactured by Matsumoto Fine Chemical Co., Ltd.) were used, instead of using 0.7 g of epoxy crosslinking agent (EX-810, manufactured by NOF Corporation).

The cross-linked structure formed by the above reaction is a structure having a —NH—Ti—O— bond, in the (B) group.

Example 16

<Preparation of Carbon Dioxide Separation Member (16)>

Preparation of carbon dioxide separation member (16) was conducted in a manner similar to that in Example 1, except that 50 g of a 5% by mass aqueous solution of polyethyleneimine (manufactured by Sigma-Aldrich Corporation) having a molecular weight of 20,000 were used, instead of using 50 g of a 5% by mass aqueous solution of PVA (manufactured by Aldrich Corporation) having a molecular weight of 180,000 and a saponification rate of 99%.

The cross-linked structure formed by the above reaction is a structure having a —NH—CH$_2$—CH(OH)— bond, in the (B) group.

Example 17

<Preparation of Carbon Dioxide Separation Member (17)>

Preparation of carbon dioxide separation member (17) was conducted in a manner similar to that in Example 1, except that 0.7 g of epoxy crosslinking agent (EX-830, manufactured by NOF Corporation) were used, instead of using 0.7 g of epoxy crosslinking agent (EX-810, manufactured by NOF Corporation).

The cross-linked structure formed by the above reaction is a structure having an ether bond, in the (B) group.

Example 18

<Preparation of Carbon Dioxide Separation Member (18)>

Preparation of carbon dioxide separation member (18) was conducted in a manner similar to that in Example 1, except that 0.7 g of epoxy crosslinking agent (EX-614B, manufactured by NOF Corporation) were used, instead of using 0.7 g of epoxy crosslinking agent (EX-810, manufactured by NOF Corporation).

The cross-linked structure formed by the above reaction is a structure having an ether bond, in the (B) group.

Example 19

<Preparation of Carbon Dioxide Separation Member (19)>

Preparation of carbon dioxide separation member (19) was conducted in a manner similar to that in Example 1, except that 0.7 g of epoxy crosslinking agent (EX-512, manufactured by NOF Corporation) were used, instead of using 0.7 g of epoxy crosslinking agent (EX-810, manufactured by NOF Corporation).

The cross-linked structure formed by the above reaction is a structure having an ether bond, in the (B) group.

Example 20

<Preparation of Carbon Dioxide Separation Member (20)>

Preparation of carbon dioxide separation member (20) was conducted in a manner similar to that in Example 1, except that 0.7 g of epoxy crosslinking agent (EX-521, manufactured by NOF Corporation) were used, instead of using 0.7 g of epoxy crosslinking agent (EX-810, manufactured by NOF Corporation).

The cross-linked structure formed by the above reaction is a structure having an ether bond, in the (B) group.

Example 21

<Preparation of Carbon Dioxide Separation Member (21)>

Preparation of carbon dioxide separation member (21) was conducted in a manner similar to that in Example 1, except that 0.5 g of epoxy crosslinking agent (EX-810, manufactured by NOF Corporation) were used, instead of using 0.7 g of epoxy crosslinking agent (EX-810, manufactured by NOF Corporation).

The cross-linked structure formed by the above reaction is a structure having an ether bond, in the (B) group.

Example 22

<Preparation of Carbon Dioxide Separation Member (22)>

Preparation of carbon dioxide separation member (22) was conducted in a manner similar to that in Example 1, except that 0.25 g of epoxy crosslinking agent (EX-810, manufactured by NOF Corporation) were used, instead of using 0.7 g of epoxy crosslinking agent (EX-810, manufactured by NOF Corporation).

The cross-linked structure formed by the above reaction is a structure having an ether bond, in the (B) group.

Comparative Example 1

<Preparation of Carbon Dioxide Separation Member (C-1)>

Preparation of carbon dioxide separation member (C-1) was conducted in a manner similar to that in Example 1, except that 50 g of a 5% by mass aqueous solution of polyvinyl alcohol-polyacrylic acid copolymer (sodium salt; manufactured by Kuraray Co., Ltd.; trade name: KURASTMER AP20) were used, instead of using 50 g of a 5% by mass aqueous solution of PVA (manufactured by Aldrich Corporation) having a molecular weight of 180,000 and a saponification rate of 99%.

Comparative Example 2

<Preparation of Carbon Dioxide Separation Member (C-2)>

Preparation of carbon dioxide separation member (C-2) was conducted in a manner similar to that in Comparative Example 1, except that 0.7 g of glutaraldehyde (manufactured by Wako Pure Chemical Industries, Ltd.) were used, instead of using 0.7 g of epoxy crosslinking agent (EX-810, manufactured by NOF Corporation).

Comparative Example 3

<Preparation of Carbon Dioxide Separation Member (C-3)>

Preparation of carbon dioxide separation member (C-3) was conducted in a manner similar to that in Comparative Example 1, except that 0.7 g of organic titanium crosslinking agent (TC-315, manufactured by Matsumoto Fine Chemical Co., Ltd.) were used, instead of using 0.7 g of epoxy crosslinking agent (EX-810, manufactured by NOF Corporation).

Comparative Example 4

<Preparation of Carbon Dioxide Separation Member (C-4)>

Preparation of carbon dioxide separation member (C-4) was conducted in a manner similar to that in Example 1, except that a surface-hydrophilic (the water contact angle at 25° C. is less than 90°) s-PTFE (manufactured by Nakao Filter Media Corp.; TETRATEX 7009) was used as the support, instead of using s-PTFE (manufactured by Nakao Filter Media Corp.; 200 μm thick), which is a porous membrane having hydrophobicity.

The constitutions of Examples 1 to 22 and Comparative Examples 1 to 4 are as described below. Note that, in the tables described below, the units of the addition amounts are all "% by mass".

*1 Unit of molecular weight: $g \cdot mol^{-1}$
*2 Unit of saponification rate: %

TABLE 1

| | Binder | | | | Crosslinking Agent | | Carrier | | Film Formation Suitability Agent | | |
|---|---|---|---|---|---|---|---|---|---|---|---|
| | Polymer | Molecular Weight *1 | Saponification Rate *2 | Addition Amount | Water Addition Amount | Crosslinking Agent | Addition Amount | Carrier Agent | Addition Amount | Film Formation Suitability Agent | Addition Amount | Support |
| Example 1 | PVA | 180k | 99 | 2.5 | 90.3 | EX-810 | 0.7 | $Cs_2CO_3$ | 6.0 | Agar | 0.5 | Hydrophobic s-PTFE |
| Example 2 | PVA | 180k | 99 | 2.5 | 90.3 | Organic titanium | 0.7 | $Cs_2CO_3$ | 6.0 | Agar | 0.5 | Hydrophobic s-PTFE |
| Example 3 | PVA | 180k | 99 | 2.5 | 90.3 | Organic zirconia | 0.7 | $Cs_2CO_3$ | 6.0 | Agar | 0.5 | Hydrophobic s-PTFE |
| Example 4 | PVA | 180k | 99 | 2.5 | 90.3 | Glutaraldehyde | 0.7 | $Cs_2CO_3$ | 6.0 | Agar | 0.5 | Hydrophobic s-PTFE |
| Example 5 | PVA | 166k | 99 | 2.5 | 90.3 | EX-810 | 0.7 | $Cs_2CO_3$ | 6.0 | Agar | 0.5 | Hydrophobic s-PTFE |
| Example 6 | PVA | 130k | 98 | 2.5 | 90.3 | EX-810 | 0.7 | $Cs_2CO_3$ | 6.0 | Agar | 0.5 | Hydrophobic s-PTFE |
| Example 7 | PVA | 110k | 99 | 2.5 | 90.3 | EX-810 | 0.7 | $Cs_2CO_3$ | 6.0 | Agar | 0.5 | Hydrophobic s-PTFE |
| Example 8 | PVA | 110k | 99 | 2.5 | 90.3 | Glutaraldehyde | 0.7 | $Cs_2CO_3$ | 6.0 | Agar | 0.5 | Hydrophobic s-PTFE |

TABLE 1-continued

| | Binder | | | | Crosslinking Agent | | Carrier | | Film Formation Suitability Agent | | |
|---|---|---|---|---|---|---|---|---|---|---|---|
| | Polymer | Molecular Weight *1 | Saponification Rate *2 | Addition Amount | Water Addition Amount | Crosslinking Agent | Addition Amount | Carrier Agent | Addition Amount | Film Formation Suitability Agent | Addition Amount | Support |
| Example 9 | PVA | 110k | 99 | 2.5 | 90.3 | Organic titanium | 0.7 | $Cs_2CO_3$ | 6.0 | Agar | 0.5 | Hydrophobic s-PTFE |
| Example 10 | PAAm | 30k | — | 2.5 | 90.3 | EX-810 | 0.7 | $Cs_2CO_3$ | 6.0 | Agar | 0.5 | Hydrophobic s-PTFE |
| Example 11 | PAAm | 30k | — | 2.5 | 90.3 | Organic titanium | 0.7 | $Cs_2CO_3$ | 6.0 | Agar | 0.5 | Hydrophobic s-PTFE |
| Example 12 | PEI | 30k | — | 2.5 | 90.3 | EX-810 | 0.7 | $Cs_2CO_3$ | 6.0 | Agar | 0.5 | Hydrophobic s-PTFE |
| Example 13 | PEI | 30k | — | 2.5 | 90.3 | Organic titanium | 0.7 | $Cs_2CO_3$ | 6.0 | Agar | 0.5 | Hydrophobic s-PTFE |
| Example 14 | PAAm | 20k | — | 2.5 | 90.3 | EX-810 | 0.7 | $Cs_2CO_3$ | 6.0 | Agar | 0.5 | Hydrophobic s-PTFE |
| Example 15 | PAAm | 20k | — | 2.5 | 90.3 | Organic titanium | 0.7 | $Cs_2CO_3$ | 6.0 | Agar | 0.5 | Hydrophobic s-PTFE |
| Example 16 | PEI | 20k | — | 2.5 | 90.3 | EX-810 | 0.7 | $Cs_2CO_3$ | 6.0 | Agar | 0.5 | Hydrophobic S-PTFE |
| Example 17 | PVA | 180k | 99 | 2.5 | 90.3 | EX-830 | 0.7 | $Cs_2CO_3$ | 6.0 | Agar | 0.5 | Hydrophobic s-PTFE |
| Example 18 | PVA | 180k | 99 | 2.5 | 90.3 | EX-614B | 0.7 | $Cs_2CO_3$ | 6.0 | Agar | 0.5 | Hydrophobic s-PTFE |
| Example 19 | PVA | 180k | 99 | 2.5 | 90.3 | EX-512 | 0.7 | $Cs_2CO_3$ | 6.0 | Agar | 0.5 | Hydrophobic s-PTFE |
| Example 20 | PVA | 180k | 99 | 2.5 | 90.3 | EX-521 | 0.7 | $Cs_2CO_3$ | 6.0 | Agar | 0.5 | Hydrophobic s-PTFE |
| Example 21 | PVA | 180k | 99 | 2.5 | 90.5 | EX-810 | 0.5 | $Cs_2CO_3$ | 6.0 | Agar | 0.5 | Hydrophobic s-PTFE |
| Example 22 | PVA | 180k | 99 | 2.5 | 90.8 | EX-810 | 0.25 | $Cs_2CO_3$ | 6.0 | Agar | 0.5 | Hydrophobic s-PTFE |
| Comparative Example 1 | PVA-PAA | 70k | — | 2.5 | 90.3 | EX-810 | 0.7 | $Cs_2CO_3$ | 6.0 | Agar | 0.5 | Hydrophobic s-PTFE |
| Comparative Example 2 | PVA-PAA | 70k | — | 2.5 | 90.3 | Glutaraldehyde | 0.7 | $Cs_2CO_3$ | 6.0 | Agar | 0.5 | Hydrophobic s-PTFE |
| Comparative Example 3 | PVA-PAA | 70k | — | 2.5 | 90.3 | Organic titanium | 0.7 | $Cs_2CO_3$ | 6.0 | Agar | 0.5 | Hydrophobic s-PTFE |
| Comparative Example 4 | PVA | 180k | 99 | 2.5 | 90.3 | EX-810 | 0.7 | $Cs_2CO_3$ | 6.0 | Agar | 0.5 | Hydrophilic s-PTFE |

—Evaluation of Gas Separation—

Using the carbon dioxide separation members prepared in Examples 1 to 22 and Comparative Examples 1 to 4, evaluation was performed in regard to the performance for separation of carbon dioxide gas in a manner as described below.

The laminated body of a porous membrane and a polymer compound layer was cut into a piece having a diameter of 47 mm, and was put between two sheets of PTFE membrane filter, to produce a permeation test sample.

As the test gas, a mix gas of $CO_2/H_2$: 10/90 (volume ratio) was supplied at relative humidity of 70%, a flow rate of 100 mL/min, a temperature of 130° C., and total pressure of 3 atm, to each of the samples (effective area: 2.40 cm$^2$) described above, and an Ar gas (flow rate: 90 mL/min) was made to flow on the permeation side.

The gas that had been permeated was analyzed by gas chromatography, and the $CO_2$ permeation speed and the separation factor were calculated. The values in initial 0.7 MPa and the values in initial 5 MPa were measured, and from these obtained values, the initial variation ratio was calculated. Further, after 500 hours, measurement was carried out at 5.0 MPa, and the obtained values and the values in initial 5.0 MPa were compared, whereby the variation ratio was calculated. As the smaller the variation ratio is, the durability is evaluated as the better. The results are shown in Table 2.

—Evaluation of Adhesion—

The carbon dioxide separation members prepared in Examples 1 to 22 and Comparative Examples 1 to 4 were stored under the conditions of 25° C. and 60% RH for two hours to adjust humidity. Then, on the surface of the respective membranes, cuts of 11 lines in the longitudinal direction and 11 lines in the transverse direction were made in a grid-like manner using a utility cutter, thereby notching the surface to make 100 squares in total, and a polyester adhesive tape (No. 31B) manufactured by Nitto Denko Corporation was pasted on this surface. After 30 minutes, the tape was peeled quickly in a vertical direction, and the number of peeled squares was counted. The same test was performed three times, and the average value was calculated and evaluated based on the following three criteria.

A: In the 100 squares, peeling is not recognized at all (within the acceptable range).

B: In the 100 squares, peeling of from 1 square to 10 squares is recognized (within the acceptable range).

C: In the 100 squares, peeling of 11 squares or more is recognized.

In the cases of A and B, the adhesion of the support to the carbon dioxide separation layer is judged to be good, and in the case of C, the adhesion of the support to the carbon dioxide separation layer is judged to be poor.

The results are shown in Table 2.

TABLE 2

| | Gas Permeation Measurement Test | | | | | | | | |
|---|---|---|---|---|---|---|---|---|---|
| | Initial 0.7 MPa | | Initial 5 MPa | | | After 4 Weeks 5 MPa | | | |
| | Permeation Flow Rate Q(CO$_2$)*[1] | Separation Selectivity α*[2] | Permeation Flow Rate Q(CO$_2$) | Separation Selectivity α | Separation Selectivity Variation Ratio/% | Permeation Flow Rate Q(CO$_2$) | Separation Selectivity α | Separation Selectivity Variation Ratio/% | Adhesion Test |
| Example 1 | 141.2 | 353.2 | 138.2 | 328.2 | 7.1 | 128.2 | 318.2 | 3.0 | B |
| Example 2 | 142.5 | 356.3 | 139.5 | 331.3 | 7.0 | 129.5 | 319.3 | 3.6 | B |
| Example 3 | 139.5 | 348.8 | 136.5 | 323.8 | 7.2 | 126.5 | 310.8 | 4.0 | B |
| Example 4 | 139.8 | 349.5 | 136.8 | 324.5 | 7.2 | 126.8 | 313.5 | 3.4 | B |
| Example 5 | 119.5 | 341.4 | 116.5 | 316.4 | 7.3 | 106.5 | 304.4 | 3.8 | B |
| Example 6 | 110.5 | 315.7 | 108.5 | 290.7 | 7.9 | 100.2 | 277.7 | 4.5 | B |
| Example 7 | 90.5 | 301.7 | 88.5 | 276.7 | 8.3 | 78.5 | 263.7 | 4.7 | B |
| Example 8 | 92.5 | 308.3 | 90.5 | 283.3 | 8.1 | 80.5 | 270.3 | 4.6 | B |
| Example 9 | 93.1 | 310.3 | 91.1 | 285.3 | 8.1 | 81.1 | 272.3 | 4.6 | B |
| Example 10 | 112.2 | 374.0 | 110.2 | 349.0 | 6.7 | 100.2 | 336.0 | 3.7 | B |
| Example 11 | 110.5 | 368.3 | 108.5 | 343.3 | 6.8 | 98.5 | 330.3 | 3.8 | B |
| Example 12 | 114.3 | 381.0 | 112.3 | 356.0 | 6.6 | 102.3 | 343.0 | 3.7 | B |
| Example 13 | 112.3 | 374.3 | 110.3 | 349.3 | 6.7 | 100.3 | 336.3 | 3.7 | B |
| Example 14 | 80.2 | 267.3 | 78.2 | 242.3 | 9.4 | 68.2 | 231.3 | 4.5 | B |
| Example 15 | 82.5 | 275.0 | 80.5 | 250.0 | 9.1 | 70.5 | 239.0 | 4.4 | B |
| Example 16 | 78.5 | 261.7 | 76.5 | 236.7 | 9.6 | 66.5 | 225.7 | 4.6 | B |
| Example 17 | 144.5 | 481.7 | 142.5 | 456.7 | 5.2 | 132.5 | 443.7 | 2.8 | B |
| Example 18 | 141.5 | 471.7 | 139.5 | 446.7 | 5.3 | 129.5 | 433.7 | 2.9 | B |
| Example 19 | 143.2 | 477.3 | 141.2 | 452.3 | 5.2 | 131.2 | 439.3 | 2.9 | B |
| Example 20 | 140.5 | 468.3 | 138.5 | 443.3 | 5.3 | 128.5 | 430.3 | 2.9 | B |
| Example 21 | 150.5 | 430.0 | 148.5 | 405.0 | 5.8 | 138.5 | 375.0 | 7.4 | B |
| Example 22 | 158.5 | 495.3 | 156.5 | 470.3 | 5.0 | 146.5 | 437.3 | 7.0 | B |
| Example 23 | 140.5 | 425.8 | 138.5 | 400.8 | 5.9 | 128.5 | 391.8 | 2.2 | A |
| Comparative Example 1 | 150.5 | 376.3 | 135.5 | 150.6 | 60.0 | 50.6 | 56.2 | 62.7 | C |
| Comparative Example 2 | 151.3 | 504.3 | 136.3 | 170.4 | 66.2 | 45.6 | 50.7 | 70.3 | C |
| Comparative Example 3 | 149.6 | 498.7 | 134.6 | 192.3 | 61.4 | 48.3 | 53.7 | 72.1 | C |
| Comparative Example 4 | 20.5 | 68.3 | 18.5 | 48.3 | 29.3 | 10.3 | 11.4 | 76.3 | A |

From the results shown in Table 2, it is understood that the carbon dioxide separation members of Examples 1 to 22 according to the present invention exhibited excellent performance for separation of carbon dioxide in any conditions and had favorable durability. Further, comparing Examples 1 to 6 with Examples 7 to 9, it is confirmed that the carbon dioxide separation members, in which the polymer in the polymer compound layer is PVA having a molecular weight of 130,000 or more, are particularly superior. Also in the case of changing the crosslinking agent, the same tendency was seen.

In contrast, in Comparative Examples 1 to 3 using a copolymer having two or more types of crosslinkable groups in the molecule, it is understood that the performance after aging under high humidity and high temperature conditions for 500 hours is significantly deteriorated. It is presumed that it is because the epoxy crosslinking agent selectively reacts with the acrylic acid moiety, to form an ester bond; however, since ester bonds are poor in terms of high humidity-high temperature aging properties, the bond is decomposed by hydrolysis or the like. As shown in Comparative Examples 1 to 3, the same tendency was seen also when the crosslinking agent was changed.

Further, in the case of using, as the support, a surface-hydrophilic porous membrane, instead of using a hydrophobic porous membrane, it is understood that the gel membrane penetrates into the pores of the porous membrane, thereby excellent adhesion is realized; however, due to diffusion of carbon dioxide carrier or the like, the high humidity-high temperature aging performance is significantly deteriorated.

Example 23

<Preparation of Carbon Dioxide Separation Member (23)>

Preparation of carbon dioxide separation member (23) was conducted in a manner similar to that in Example 1, except that 0.1 g of 0.02% by mass fluorocarbon surfactant (ZONYL FSN100, manufactured by Sigma-Aldrich Corporation)) were further added.

Example 24

<Preparation of Carbon Dioxide Separation Member (24)>

Preparation of carbon dioxide separation member (24) was conducted in a manner similar to that in Example 23, except that 0.02% by mass fluorocarbon surfactant (SURFLON S-242, manufactured by Sigma-Aldrich Corporation)) was used, instead of using 0.1 g of 0.02% by mass fluorocarbon surfactant (ZONYL FSN100, manufactured by Sigma-Aldrich Corporation)).

Example 25

<Preparation of Carbon Dioxide Separation Member (25)>

Preparation of carbon dioxide separation member (25) was conducted in a manner similar to that in Example 24, except that 3.2 g of 40% by mass potassium carbonate and 1.2 g of glycine were used, instead of using 15 g of a 40% by mass aqueous solution of cesium carbonate.

Example 26

<Preparation of Carbon Dioxide Separation Member (26)>

Preparation of carbon dioxide separation member (26) was conducted in a manner similar to that in Example 23, except that an aqueous solution containing 0.1 g of fluorocarbon surfactant (PLURONIC PE6400, manufactured by Sigma-Aldrich Corporation) was additionally added, instead of adding 0.1 g of 0.02% by mass fluorocarbon surfactant (ZONYL FSN100, manufactured by Sigma-Aldrich Corporation).

Example 27

<Preparation of Carbon Dioxide Separation Member (27)>

Preparation of carbon dioxide separation member (27) was conducted in a manner similar to that in Example 1, except that 2 g of 0.02% by mass fluorocarbon surfactant (ZONYL FSN100, manufactured by Sigma-Aldrich Corporation)) were further added.

Example 28

<Preparation of Carbon Dioxide Separation Member (28)>

Preparation of carbon dioxide separation member (28) was conducted in a manner similar to that in Example 1, except that 2 g of 0.02% by mass fluorocarbon surfactant (SURFLON S-242, manufactured by Sigma-Aldrich Corporation)) were further added.

Example 29

<Preparation of Carbon Dioxide Separation Member (29)>

Preparation of carbon dioxide separation member (29) was conducted in a manner similar to that in Example 23, except that an aqueous solution containing 2 g of fluorocarbon surfactant (PLURONIC PE6400, manufactured by Sigma-Aldrich Corporation) was further added, instead of adding 0.1 g of 0.02% by mass fluorocarbon surfactant (ZONYL FSN100, manufactured by Sigma-Aldrich Corporation).

Example 30

<Preparation of Carbon Dioxide Separation Member (30)>

Preparation of carbon dioxide separation member (30) was conducted in a manner similar to that in Example 1, except that a coating liquid was prepared by dispersing 0.3 g of 0.1 μm particle diameter-alkaline zirconia sol (NANOUSE ZR-40BL, manufactured by Nissan Chemical Industries, Ltd.).

Example 31

<Preparation of Carbon Dioxide Separation Member (31)>

Preparation of carbon dioxide separation member (31) was conducted in a manner similar to that in Example 30, except that a coating liquid was prepared by dispersing 0.3 g of alkaline titania sol (NANOUSE ZR-40BL, manufactured by Nissan Chemical Industries, Ltd.), instead of dispersing 0.3 g of 0.1 μm particle diameter-alkaline zirconia sol (NANOUSE ZR-40BL, manufactured by Nissan Chemical Industries, Ltd.).

Example 32

<Preparation of Carbon Dioxide Separation Member (32)>

Preparation of carbon dioxide separation member (32) was conducted in a manner similar to that in Example 30, except that a coating liquid was prepared by dispersing 0.3 g of 0.1 μm particle diameter-carbon nanofiber (CNT-F, manufactured by Mitsubishi Materials Electronic Chemicals Co., Ltd.), instead of dispersing 0.3 g of 0.1 μm particle diameter-alkaline zirconia sol (NANOUSE ZR-40BL, manufactured by Nissan Chemical Industries, Ltd.).

Example 33

<Preparation of Carbon Dioxide Separation Member (33)>

Preparation of carbon dioxide separation member (33) was conducted in a manner similar to that in Example 1, except that a coating liquid was prepared by dispersing 0.1 g of 0.1 μm particle diameter-alkaline zirconia sol (NANOUSE ZR-40BL, manufactured by Nissan Chemical Industries, Ltd.).

Example 34

<Preparation of Carbon Dioxide Separation Member (34)>

Preparation of carbon dioxide separation member (34) was conducted in a manner similar to that in Example 30, except that a coating liquid was prepared by dispersing 0.1 g of alkaline titania sol (NANOUSE ZR-40BL, manufactured by Nissan Chemical Industries, Ltd.), instead of dispersing 0.2 g of 0.1 μm particle diameter-alkaline zirconia sol (NANOUSE ZR-40BL, manufactured by Nissan Chemical Industries, Ltd.).

Example 35

<Preparation of Carbon Dioxide Separation Member (35)>

Preparation of carbon dioxide separation member (35) was conducted in a manner similar to that in Example 30, except that a coating liquid was prepared by dispersing 0.1 g of 0.1 μm particle diameter-carbon nanofiber (CNT-F, manufactured by Mitsubishi Materials Electronic Chemicals Co., Ltd.), instead of dispersing 0.2 g of 0.1 μm particle diameter-alkaline zirconia sol (NANOUSE ZR-40BL, manufactured by Nissan Chemical Industries, Ltd.).

Example 36

<Preparation of Carbon Dioxide Separation Member (36)>

A 10% by mass solution of siloxane (manufactured by Shin-Etsu Chemical Co., Ltd.) was coated on a hydrophobic s-PTFE (manufactured by Nakao Filter Media Corp.; 200

μm thick) to form a siloxane layer having a thickness of 1.0 μm on the hydrophobic s-PTFE. On the hydrophobic s-PTFE having the siloxane layer formed thereon, the coating liquid described in Example 1 was coated and then dried, to prepare carbon dioxide separation member (36).

Example 37

<Preparation of Carbon Dioxide Separation Member (37)>
A 10% by mass aqueous solution of polyacrylic acid (manufactured by Sigma-Aldrich Corporation) was coated on a hydrophobic s-PTFE (manufactured by Nakao Filter Media Corp.; 200 μm thick) to form an acrylic acid layer having a thickness of 1.0 μm on the hydrophobic s-PTFE. On the hydrophobic s-PTFE having the acrylic acid layer formed thereon, the coating liquid described in Example 1 was coated and then dried, to prepare carbon dioxide separation member (37).

Example 38

<Preparation of Carbon Dioxide Separation Member (38)>
A 10% by mass solution of siloxane (manufactured by Shin-Etsu Chemical Co., Ltd.) was coated on a hydrophobic s-PTFE (manufactured by Nakao Filter Media Corp.; 200 μm thick) to form a siloxane layer having a thickness of 0.5 μm on the hydrophobic s-PTFE. On the hydrophobic s-PTFE having the siloxane layer formed thereon, the coating liquid described in Example 1 was coated and then dried, to prepare carbon dioxide separation member (38).

Example 39

<Preparation of Carbon Dioxide Separation Member (39)>
Preparation of carbon dioxide separation member (39) was conducted in a manner similar to that in Example 1, except that 50 g of a 5% by mass aqueous solution of PVA (manufactured by Sigma-Aldrich Corporation) having a molecular weight of 74,800 and a saponification rate of 99% were used, instead of using 50 g of a 5% by mass aqueous solution of PVA (manufactured by Sigma-Aldrich Corporation) having a molecular weight of 180,000 and a saponification rate of 99%.

Example 40

<Preparation of Carbon Dioxide Separation Member (40)>
Preparation of carbon dioxide separation member (40) was conducted in a manner similar to that in Example 1, except that 50 g of a 5% by mass aqueous solution of PVA (manufactured by Sigma-Aldrich Corporation) having a molecular weight of 180,000 and a saponification rate of 85% were used, instead of using 50 g of a 5% by mass aqueous solution of PVA (manufactured by Sigma-Aldrich Corporation) having a molecular weight of 180,000 and a saponification rate of 99%.

Example 41

<Preparation of Carbon Dioxide Separation Member (41)>
Preparation of carbon dioxide separation member (41) was conducted in a manner similar to that in Example 1, except that 2.0 g of epoxy crosslinking agent (EX-810, manufactured by NOF Corporation) were used, instead of using 0.7 g of epoxy crosslinking agent (EX-810, manufactured by NOF Corporation).

Example 42

<Preparation of Carbon Dioxide Separation Member (42)>
Preparation of carbon dioxide separation member (42) was conducted in a manner similar to that in Example 23, except that an aqueous solution containing 2 g of fluorocarbon surfactant (ZONYL FSN100, manufactured by Sigma-Aldrich Corporation) was additionally added, instead of adding g of 0.02% by mass fluorocarbon surfactant (ZONYL FSN100, manufactured by Sigma-Aldrich Corporation).

Example 43

<Preparation of Carbon Dioxide Separation Member (43)>
Preparation of carbon dioxide separation member (43) was conducted in a manner similar to that in Example 1, except that a coating liquid was prepared by dispersing 1 g of 0.1 nm particle diameter-alkaline zirconia sol (NANOUSE ZR-40BL, manufactured by Nissan Chemical Industries, Ltd.).

The constitutions of the carbon dioxide separation members of Example 23 to Example 43 are shown in Table 3 below. Further, evaluation of these carbon dioxide separation members was conducted in a manner similar to that in Example 1, and the results are shown in Table 4 below.

*1 Unit of permeation flow rate: $1\times10^{-5}$ cm$^3$ (STP)/(s·cm$^2$·cmHg)
*2 $\alpha = Q(CO_2)/Q(H_2)$
All are expressed as the average value of n=5

TABLE 3

| | | Binder | | | Water | Crosslinking Agent | | | | Film Formation Suitability Agent | | Additive or Compound contained in Carrier Diffusion Suppressing Layer | |
|---|---|---|---|---|---|---|---|---|---|---|---|---|---|
| | Polymer | Molecular Weight *1 | Saponification Rate *2 | Addition Amount | Addition Amount | Crosslinking Agent | Addition Amount | Carrier | Carrier Addition | Film Formation Suitability Agent | Addition Amount | Compound | Content |
| Example 23 | PVA | 180k | 99 | 2.5 | 90.3 | EX-810 | 0.7 | Cs$_2$CO$_3$ | 6.0 | Agar | 0.5 | Surfactant ZONYL FSN100 | 0.1 |
| Example 24 | PVA | 180k | 99 | 2.5 | 90.3 | EX-810 | 0.7 | Cs$_2$CO$_3$ | 6.0 | Agar | 0.5 | Surfactant SURFLON S-242 | 0.1 |

TABLE 3-continued

| | | Binder | | | | Crosslinking Agent | | | | Film Formation Suitability Agent | | Additive or Compound contained in Carrier Diffusion Suppressing Layer | |
|---|---|---|---|---|---|---|---|---|---|---|---|---|---|
| | Polymer | Molecular Weight *1 | Saponification Rate *2 | Addition Amount | Water Addition Amount | Crosslinking Agent | Addition Amount | Carrier | Carrier Addition Amount | Film Formation Suitability Agent | Addition Amount | Compound | Content |
| Example 25 | PVA | 180k | 99 | 2.5 | 95.1 | EX-810 | 0.7 | $K_2CO_3$ | 1.2 | Agar | 0.5 | Glycine Surfactant SURFLON S-242 | 1.2 0.1 |
| Example 26 | PVA | 180k | 99 | 2.5 | 90.3 | EX-810 | 0.7 | $Cs_2CO_3$ | 6.0 | Agar | 0.5 | Surfactant PULRONIC PE6400 | 0.1 |
| Example 27 | PVA | 180k | 99 | 2.5 | 90.3 | EX-810 | 0.7 | $Cs_2CO_3$ | 6.0 | Agar | 0.5 | Surfactant ZONYL FSN100 | 2.0 |
| Example 28 | PVA | 180k | 99 | 2.5 | 90.3 | EX-810 | 0.7 | $Cs_2CO_3$ | 6.0 | Agar | 0.5 | Surfactant SURFLON S-242 | 2.0 |
| Example 29 | PVA | 180k | 99 | 2.5 | 90.3 | EX-810 | 0.7 | $Cs_2CO_3$ | 6.0 | Agar | 0.5 | Surfactant PULRONIC PE6400 | 2.0 |
| Example 30 | PVA | 180k | 99 | 2.5 | 90.3 | EX-810 | 0.7 | $Cs_2CO_3$ | 6.0 | Agar | 0.5 | Inorganic filler Zirconia sol | 0.3 |
| Example 31 | PVA | 180k | 99 | 2.5 | 90.3 | EX-810 | 0.7 | $Cs_2CO_3$ | 6.0 | Agar | 0.5 | Inorganic filler Titania sol | 0.3 |
| Example 32 | PVA | 180k | 99 | 2.5 | 90.3 | EX-810 | 0.7 | $Cs_2CO_3$ | 6.0 | Agar | 0.5 | Inorganic filler Carbon nanofiber | 0.3 |
| Example 33 | PVA | 180k | 99 | 2.5 | 90.3 | EX-810 | 0.7 | $Cs_2CO_3$ | 6.0 | Agar | 0.5 | Inorganic filler Zirconia sol | 0.2 |
| Example 34 | PVA | 180k | 99 | 2.5 | 90.3 | EX-810 | 0.7 | $Cs_2CO_3$ | 6.0 | Agar | 0.5 | Inorganic filler Titania sol | 0.15 |
| Example 35 | PVA | 180k | 99 | 2.5 | 90.3 | EX-810 | 0.7 | $Cs_2CO_3$ | 6.0 | Agar | 0.5 | Inorganic filler Carbon nanofiber | 0.15 |
| Example 36 | PVA | 180k | 99 | 2.5 | 90.3 | EX-810 | 0.7 | $Cs_2CO_3$ | 6.0 | Agar | 0.5 | Diffusion suppressing layer 1.0 μm Siloxane | |
| Example 37 | PVA | 180k | 99 | 2.5 | 90.3 | EX-810 | 0.7 | $Cs_2CO_3$ | 6.0 | Agar | 0.5 | Diffusion suppressing layer 1.0 μm Polyacrylic acid | |
| Example 38 | PVA | 180k | 99 | 2.5 | 90.3 | EX-810 | 0.7 | $Cs_2CO_3$ | 6.0 | Agar | 0.5 | Diffusion suppressing layer 0.5 μm Siloxane | |
| Example 39 | PVA | 74.8k | 99 | 2.5 | 90.3 | EX-810 | 0.7 | $Cs_2CO_3$ | 6.0 | Agar | 0.5 | — | — |
| Example 40 | PVA | 180k | 85 | 2.5 | 90.3 | EX-810 | 0.7 | $Cs_2CO_3$ | 6.0 | Agar | 0.5 | — | — |
| Example 41 | PVA | 180k | 99 | 2.5 | 89.0 | EX-810 | 2 | $Cs_2CO_3$ | 6.0 | Agar | 0.5 | — | — |
| Example 42 | PVA | 180k | 99 | 2.5 | 90.3 | EX-810 | 0.7 | $Cs_2CO_3$ | 6.0 | Agar | 0.5 | ZONYL FSN100 | 3.0 |
| Example 43 | PVA | 180k | 99 | 2.5 | 90.3 | EX-810 | 0.7 | $Cs_2CO_3$ | 6.0 | Agar | 0.5 | Zirconia sol | 1.0 |

TABLE 4

| | Gas Permeation Measurement Test | | | | | | | |
|---|---|---|---|---|---|---|---|---|
| | Initial 0.7 MPa | | Initial 5 MPa | | | After 4 Weeks 5 MPa | | |
| | Permeation Flow Rate $Q(CO_2)$*1 | Separation Selectivity α*2 | Permeation Flow Rate $Q(CO_2)$ | Separation Selectivity α | Separation Selectivity Variation Ratio/% | Permeation Flow Rate $Q(CO_2)$ | Separation Selectivity α | Separation Selectivity Variation Ratio/% | Adhesion Test |
| Example 23 | 140.5 | 425.8 | 138.5 | 400.8 | 5.9 | 128.5 | 391.8 | 2.2 | A |
| Example 24 | 138.5 | 461.7 | 136.5 | 436.7 | 5.4 | 126.5 | 426.7 | 2.3 | A |
| Example 25 | 136.4 | 454.7 | 134.4 | 429.7 | 5.5 | 124.4 | 418.7 | 2.6 | A |

TABLE 4-continued

| | Gas Permeation Measurement Test | | | | | | | | |
|---|---|---|---|---|---|---|---|---|---|
| | Initial 0.7 MPa | | Initial 5 MPa | | | After 4 Weeks 5 MPa | | | |
| | Permeation Flow Rate $Q(CO_2)$*1 | Separation Selectivity $\alpha$*2 | Permeation Flow Rate $Q(CO_2)$ | Separation Selectivity $\alpha$ | Separation Selectivity Variation Ratio/% | Permeation Flow Rate $Q(CO_2)$ | Separation Selectivity $\alpha$ | Separation Selectivity Variation Ratio/% | Adhesion Test |
| Example 26 | 139.5 | 465.0 | 137.5 | 440.0 | 5.4 | 127.5 | 427.0 | 3.0 | A |
| Example 27 | 122.5 | 408.3 | 120.5 | 383.3 | 6.1 | 110.5 | 370.3 | 3.4 | A |
| Example 28 | 138.6 | 462.0 | 136.6 | 437.0 | 5.4 | 126.6 | 428.0 | 2.1 | A |
| Example 29 | 123.5 | 411.7 | 121.5 | 386.7 | 6.1 | 111.5 | 373.7 | 3.4 | A |
| Example 30 | 130.5 | 435.0 | 128.5 | 427.0 | 1.8 | 118.5 | 399.0 | 6.6 | A |
| Example 31 | 128.3 | 427.7 | 126.3 | 419.7 | 1.9 | 116.3 | 389.7 | 7.1 | A |
| Example 32 | 127.5 | 425.0 | 125.5 | 417.0 | 1.9 | 115.5 | 387.0 | 7.2 | A |
| Example 33 | 124.3 | 414.3 | 122.3 | 406.3 | 1.9 | 112.3 | 376.3 | 7.4 | A |
| Example 34 | 133.5 | 445 | 131.5 | 433 | 2.7 | 121.5 | 413.0 | 4.6 | A |
| Example 35 | 136.2 | 454 | 134.2 | 442.5 | 2.5 | 124.2 | 422.5 | 4.5 | A |
| Example 36 | 120.5 | 401.7 | 118.5 | 381.7 | 5.0 | 108.5 | 371.7 | 2.6 | A |
| Example 37 | 124.5 | 415.0 | 122.5 | 394.0 | 5.1 | 112.5 | 384.0 | 2.5 | A |
| Example 38 | 126.3 | 421.0 | 124.3 | 400.0 | 5.0 | 114.3 | 390.0 | 2.5 | A |
| Example 39 | 80.2 | 267.3 | 78.2 | 247.3 | 7.5 | 68.2 | 237.3 | 4.0 | B |
| Example 40 | 85.5 | 285.0 | 83.5 | 265.0 | 7.0 | 73.5 | 255.0 | 3.8 | B |
| Example 41 | 100.6 | 335.3 | 98.6 | 315.3 | 6.0 | 88.6 | 305.3 | 3.2 | B |
| Example 42 | 102.6 | 342.0 | 100.6 | 322.0 | 5.8 | 90.6 | 312.0 | 3.1 | A |
| Example 43 | 105.3 | 351.0 | 103.3 | 331.0 | 5.7 | 93.3 | 321.0 | 3.0 | B |

As shown in Table 4, the carbon dioxide separation members according to the present invention exhibited excellent carbon dioxide separation performance and durability thereof. Particularly, comparing Example 1 with Examples 23 to 29, it is understood that durability is further improved by the addition of a surfactant to the polymer compound layer. Further, from Examples 30 to 35, it is understood that, by the addition of a filler to the polymer compound layer, the carbon dioxide separation performance is improved and the initial variation ratio is reduced.

Moreover, in a case of providing a carrier diffusion suppressing layer between the porous membrane and the polymer compound layer, it is understood that, even though the film thickness of the carrier diffusion suppressing layer is extremely small, it is useful to further improve the durability.

Example 44

<Preparation of Carbon Dioxide Separation Module>

19 pairs of carbon dioxide separation member (laminated body) 14, which was prepared in Example 1 by placing a carbon dioxide separation membrane on a porous membrane, and flow passage member 16 were used and wound around a central pipe 12 having a diameter of 59 mm and having holes, thereby preparing a spiral wound type carbon dioxide separation module 10 having a structure shown in FIG. 1.

It was confirmed that the thus prepared carbon dioxide separation module according to the present invention had good carbon dioxide separation performance as well as a long life time, in accordance with the performance of the carbon dioxide separation membrane incorporated.

The disclosure of Japanese Patent Application No. 2011-167196 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A carbon dioxide separation member comprising:
   a hydrophobic porous membrane that has a heat resistance of 100° C. or higher; and
   a polymer compound layer that is formed on a surface of the porous membrane, the polymer compound layer including moisture, and at least one carbon dioxide carrier selected from the group consisting of alkali metal carbonates, alkali metal bicarbonates and alkali metal hydroxides, and
   the polymer compound layer having a cross-linked structure that is formed with a single crosslinkable group selected from the following (A) group, the cross-linked structure including a hydrolysis-resistant bond selected from the following (B) group:
   (A) group consists of —OH, —NH$_2$, —Cl, —CN, —COOH, and an epoxy group, and
   (B) group consists of an ether bond, an acetal bond, —NH—CH$_2$—CH(OH)—, —O-M-O—, —NH—M-O—, a urethane bond, —CH$_2$—CH(OH)—, and an amido bond, in which M represents Ti or Zr,
   wherein the carbon dioxide separation member selectively allows a carbon dioxide gas in a mixture of the carbon dioxide gas and a hydrogen gas to permeate therethrough under temperature conditions from 100° C. to 250° C.

2. The carbon dioxide separation member according to claim 1, wherein a polymer compound used for the formation of the polymer compound layer has —OH as a single crosslinkable group and has a weight average molecular weight of from 130,000 to 6,000,000.

3. The carbon dioxide separation member according to claim 2, wherein the polymer compound is polyvinyl alcohol having a weight average molecular weight of from 130,000 to 6,000,000.

4. The carbon dioxide separation member according to claim 1, wherein a polymer compound used for the formation of the polymer compound layer has —NH$_2$ as a single crosslinkable group and has a weight average molecular weight of from 10,000 to 6,000,000.

5. The carbon dioxide separation member according to claim 2, wherein the cross-linked structure includes an ether bond formed by allowing a crosslinking agent, that is selected from di- or higher functional epoxy compounds, to react with the single crosslinkable group possessed by the polymer compound.

6. The carbon dioxide separation member according to claim 2, wherein the cross-linked structure is a cross-linked structure formed by reacting 0.01 mol to 80 mol of a crosslinking agent with 100 mol of the single crosslinkable group possessed by the polymer compound.

7. The carbon dioxide separation member according to claim 4, wherein the cross-linked structure includes an ether bond formed by allowing a crosslinking agent, that is selected from di- or higher functional epoxy compounds, to react with the single crosslinkable group possessed by the polymer compound.

8. The carbon dioxide separation member according to claim 4, wherein the cross-linked structure is a cross-linked structure formed by reacting 0.01 mol to 80 mol of a crosslinking agent with 100 mol of the single crosslinkable group possessed by the polymer compound.

9. The carbon dioxide separation member according to claim 1, wherein each of the alkali metal carbonates, the alkali metal bicarbonates, and the alkali metal hydroxides includes an alkaline metal atom selected from the group consisting of cesium, rubidium, potassium and sodium.

10. The carbon dioxide separation member according to claim 1, wherein the polymer compound layer further includes a surfactant.

11. The carbon dioxide separation member according to claim 1, wherein the polymer compound layer further includes a filler.

12. The carbon dioxide separation member according to claim 1, wherein the polymer compound layer further includes a film formation suitability imparting agent.

13. The carbon dioxide separation member according to claim 1, comprising, between the polymer compound layer and the hydrophobic porous membrane, a carrier diffusion suppressing layer that suppresses diffusion of the carbon dioxide carrier.

14. The carbon dioxide separation member according to claim 1, wherein the hydrophobic porous membrane includes at least one selected from the group consisting of ceramics, polytetrafluoroethylene (PTFE), polyvinylidene fluoride, polyethersulfone (PES), polyphenylene sulfide (PPS), polysulfone (PSF), polyimide (PI), polypropylene (PP), polyetherimide and polyetheretherketone.

15. A method for producing the carbon dioxide separation member according to claim 1, the method comprising:
  coating, on the hydrophobic porous membrane having a heat resistance of 100° C. or higher, a casting liquid including:
  at least one carbon dioxide carrier selected from the group consisting of alkali metal carbonates, alkali metal bicarbonates and alkali metal hydroxides,
  an aqueous solution of a polymer compound having a single crosslinkable group selected from the following (A) group, and
  a crosslinking agent; and
  allowing the single crosslinkable group possessed by the polymer compound to react with the crosslinking agent in the casting liquid to form the polymer compound layer having the cross-linked structure that includes the hydrolysis-resistant bond selected from the following (B) group,
  wherein (A) group consists of —OH, —NH$_2$, —Cl, —CN, —COOH, and an epoxy group; and
  (B) group consists of an ether bond, an acetal bond, —NH—CH$_2$—CH(OH)—, —O-M-O—, —NH—M-O—, a urethane bond, -CH$_2$—CH(OH) —, and an amido bond, in which M represents Ti or Zr.

16. The method for producing a carbon dioxide separation member according to claim 15, wherein the polymer compound layer includes a polyvinyl alcohol gel having a cross-linked structure.

17. A carbon dioxide separation module comprising the carbon dioxide separation member according to claim 1 module comprising the carbon dioxide separation member according to claim 1.

* * * * *